United States Patent
Morinaga et al.

(10) Patent No.: US 7,152,643 B2
(45) Date of Patent: Dec. 26, 2006

(54) RIM WHEEL, AND TIRE-RIM ASSEMBLY

(75) Inventors: Hiroshi Morinaga, Kodaira (JP); Hidetoshi Yokota, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 169 days.

(21) Appl. No.: 10/490,159

(22) PCT Filed: May 20, 2002

(86) PCT No.: PCT/JP02/04842

§ 371 (c)(1), (2), (4) Date: Aug. 13, 2004

(87) PCT Pub. No.: WO03/029028

PCT Pub. Date: Apr. 10, 2003

(65) Prior Publication Data

US 2004/0250935 A1 Dec. 16, 2004

(30) Foreign Application Priority Data

Sep. 18, 2001 (JP) .............................. 2001-283092

(51) Int. Cl.
 *B60B 21/00* (2006.01)
 *B60C 15/00* (2006.01)
(52) U.S. Cl. .................................. 152/381.5; 301/6.91
(58) Field of Classification Search ............. 152/381.4, 152/381.5, 381.6, 400; 301/6.91; 295/7
 See application file for complete search history.

(56) References Cited

U.S. PATENT DOCUMENTS

| | | | | |
|---|---|---|---|---|
| 4,346,747 A | * | 8/1982 | Osada et al. ................. | 152/158 |
| 4,501,341 A | * | 2/1985 | Jones ........................... | 181/250 |
| 4,896,921 A | * | 1/1990 | Sato et al. .................... | 301/5.1 |
| 5,000,241 A | * | 3/1991 | Patecell ....................... | 152/382 |
| 5,891,278 A | * | 4/1999 | Rivin ........................... | 152/418 |
| 6,516,849 B1 | * | 2/2003 | Flament et al. ............. | 152/400 |
| 2005/0212350 A1 | * | 9/2005 | Yamamoto et al. .... | 301/63.101 |

FOREIGN PATENT DOCUMENTS

| | | |
|---|---|---|
| EP | 0 936 083 A2 | 8/1999 |
| JP | 64-39103 U | 3/1989 |
| JP | 64-078902 A | 3/1989 |
| JP | 01-115701 A | 5/1989 |
| JP | 01-115702 A | 5/1989 |
| JP | 1-90601 U | 6/1989 |
| JP | 01-202501 A | 8/1989 |

(Continued)

*Primary Examiner*—Russell D. Stormer
(74) *Attorney, Agent, or Firm*—Sughrue Mion, PLLC

(57) ABSTRACT

A purpose of the present invention is to provide a rim wheel and a tire rim assembly which are capable of effectively reducing cavity resonance of a tire, and accordingly, enhancing quietness and riding comfort. A plurality of cap members 20 is arranged on an outer circumferential surface of a rim 16 in a circumferential direction thereof, diaphragms are disposed inwardly of each cap member 20, and a plurality of sub-air chambers 32 is formed between the rim 16 and the cap members 20 in a rim circumferential direction. The tire main air chamber 18 is connected to the sub-air chambers 32 through communicating holes 24 formed on the cap members 20. The sub-air chambers 32 and the communicating holes 24 constitute a Helmholtz resonance noise absorber that can absorb vibration with specified frequencies. Further, since the sub-air chamber 32 is not formed in a continuous annular shape in a tire circumferential direction, occurrence of cavity resonance can be suppressed and a substantial reduction in noise can be secured.

10 Claims, 33 Drawing Sheets

FOREIGN PATENT DOCUMENTS

| | | |
|---|---|---|
| JP | 01-240302 A | 9/1989 |
| JP | 01-314612 A | 12/1989 |
| JP | 2-30704 U | 2/1990 |
| JP | 2002-178727 * | 6/2002 |
| JP | 2004-82947 * | 3/2004 |
| JP | 2004-106719 * | 4/2004 |

* cited by examiner

OUT ← → IN

WELDED PART

OUT ← → IN

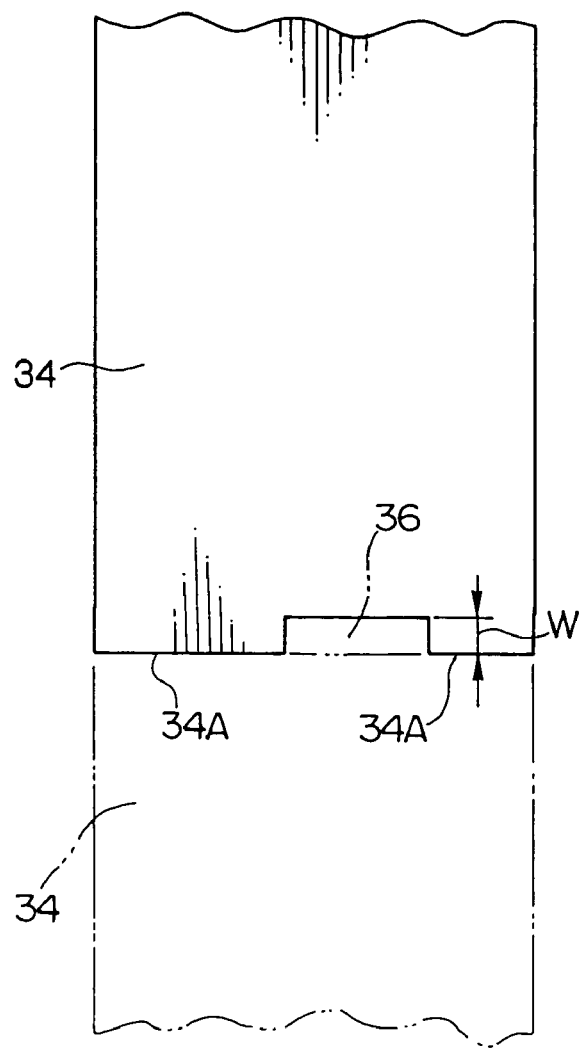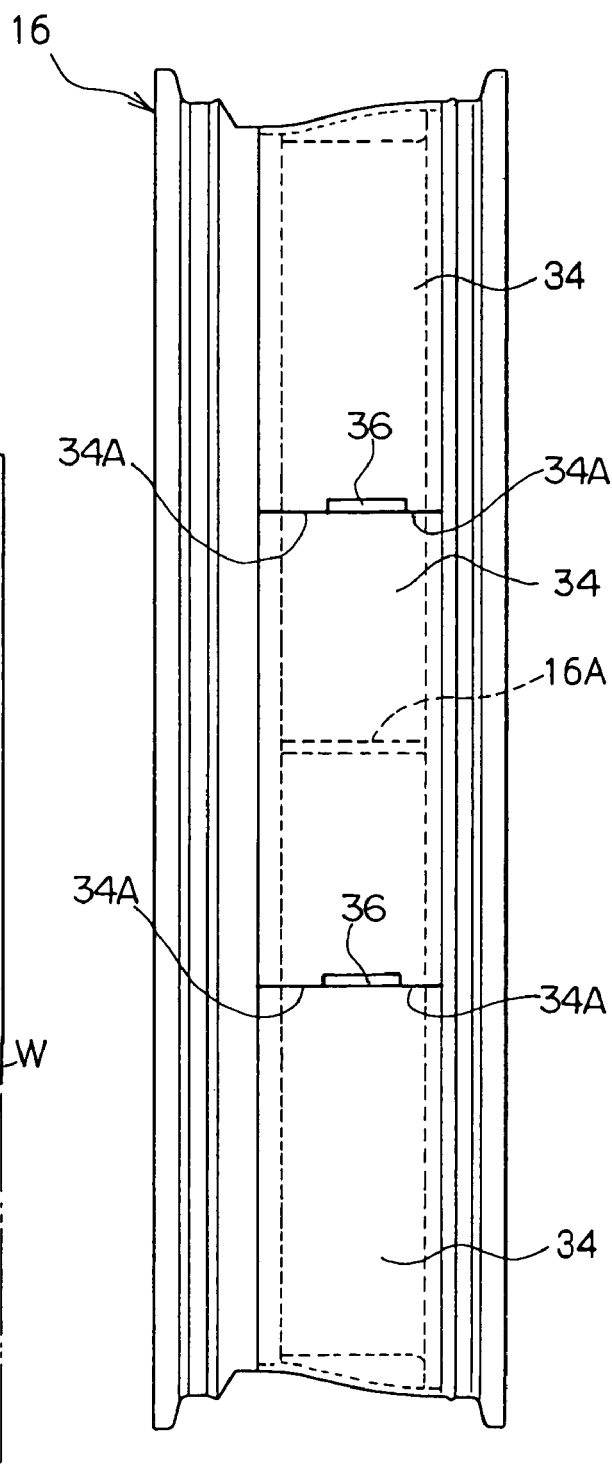

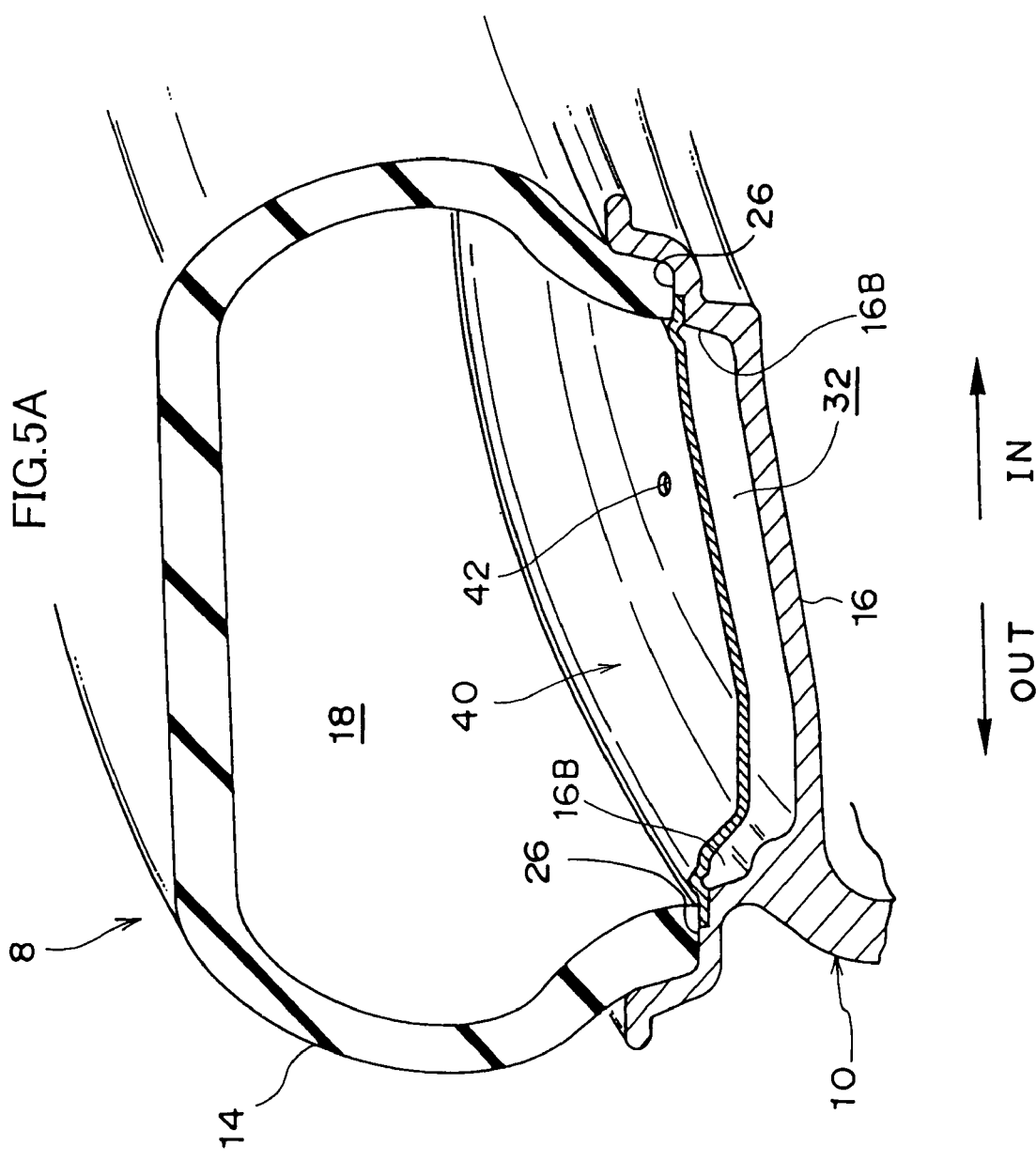
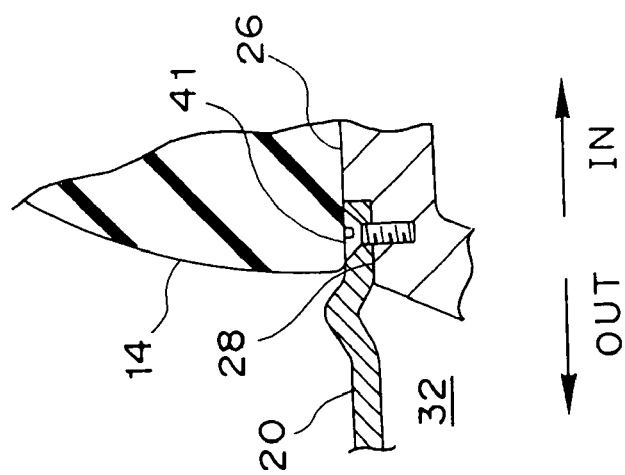

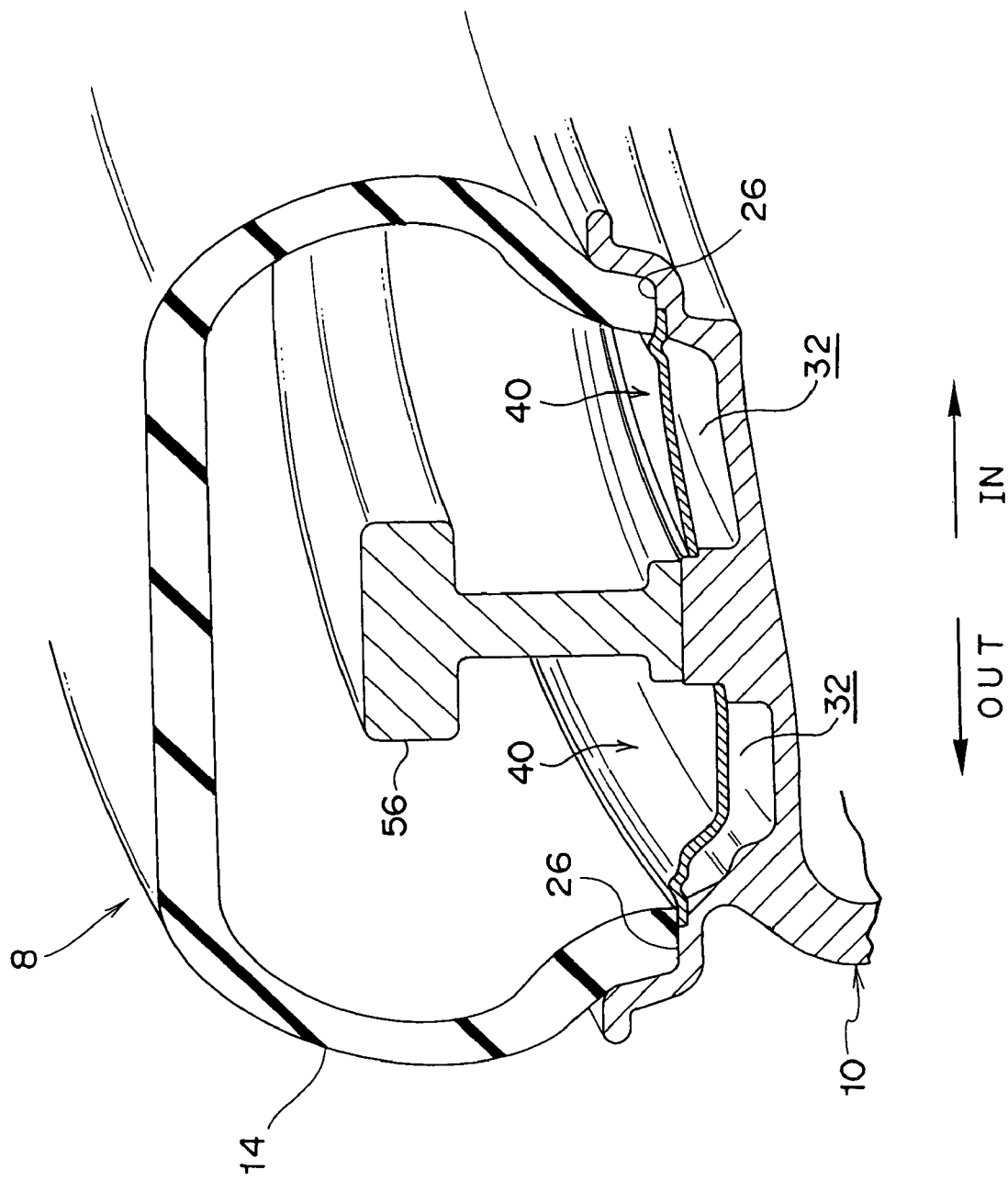

REAR SEAT

RIM WHEEL, AND TIRE-RIM ASSEMBLY

BACKGROUND OF THE INVENTION

1. Field of the Invention

The present invention relates to a rim wheel for a vehicle to which a tire is attached, and a tire rim assembly. More particularly, the present invention relates to a rim wheel and a tire rim assembly which can suppress vibration transmitted to a vehicle at the same time as serving high steering stability thus contributing to improve merits in riding comfort, noise reduction inside the vehicle, and the like.

2. Background Art

In recent years, high functional performances in automobiles are on demand, particularly in the area of luxury automobiles, in which high functional performances good controllability, a high level of riding comfort and quietness are to be excellently secured.

In view of the aforementioned facts, in the so-called "leg vicinity" category including tires, rim wheels and suspensions, improvements has been achieved in technologies for active control of a suspension, rubber for prevention of vibration and the structure of tires.

As far as a rim wheel is concerned, Japanese Utility Model Applications (JP-U) Laid-Open Nos. 1-39103 and 1-90601, Japanese Patent Applications (JP-A) Laid-Open Nos. 1-115701 and 1-115702, and EP No. 0936083 disclose therein technology designed to reduce cavity resonance of a tire, which is the main cause of noise inside vehicles. According to the technology disclosed, sub-air chambers are provided inside a rim wheel, and a dimensional relationship between sub-air chambers and communicating holes is controlled, so that sub air chambers are operated as a Helmholtz resonance noise absorber.

The Helmholtz resonance noise absorber is a technique of which effect has been field-proven in acoustic rooms and the like, and is supposed to be effective for suppressing standing sound (noise).

The inventors have studied intensively the known documents described above in which the Helmholtz resonance noise absorber has been applied to a wheel, and they have discovered that, as described below, improvements achieved with this resonator have so far been inadequate, and that problems have been experienced in its practical applications.

In the first place, sufficient benefits cannot be obtained unless a total volume of sub-air chambers used for the Helmholtz resonance noise absorber is sufficiently big in size in relation to a volume of main air chambers of a tire whose level of noise it is intended to be reduced.

Embodiments of JP-U No. 1-90601, JP-A No. 1-115701, and EP No. 0936083 are structured such that sub-air chambers are formed in a disk or in a spoke. An embodiment of EP No. 0936083 is structured such that sub-air chambers are formed adjacent to a disk or a spoke. However, in practice, it is necessary to obtain a brake space and this makes it difficult to form a large air chamber in the same area.

More specifically, most types of automobile are equipped with a disk brake at front wheel portions, and a brake caliper is disposed somewhat close to an inner portion in a vehicle axis direction of a rim wheel spoke.

Further, from the viewpoint of the rigidity of a rim, there is a limit to possible reductions in a plate thickness of a spoke.

An embodiment of EP No. 0936083 is structured such that sub-air chambers are provided at a rim base portion. However, obtaining a large volume is also difficult. Although a certain degree of noise reduction can be expected, this is not sufficient to meet the level of reduction desired.

Moreover, in the case of a Helmholtz resonance noise absorber, the Helmholtz resonance frequency, which is determined by a relational expression of factors such as a volume of a sub-air chamber and a length, or a cross-sectional area, of a communicating hole, must be set precisely within a given range.

If errors on these factors occur, resonance frequencies deflect from one another, and a sufficient noise reduction cannot be obtained.

As methods for forming sub-air chambers inside a rim wheel, for example, as disclosed in EP No. 0936083, a casting method using a core or a casting method using an embedded hollow body, can be cited. However, obtaining dimensional or positional accuracy of sub-air chambers is difficult, and for example, there is a fear that noise reduction may be hampered by variations in lengths of communicating holes.

Furthermore, increases in manufacturing costs, deterioration in productivity and deterioration in a rotational balance can also be disadvantages.

On the other hand, since JP-U No. 1-39103 does not include so-called terms for correcting opening ends in the aforementioned relational expression of the resonance frequency, an appropriate setting cannot be achieved, making it impossible to obtain a sufficient degree of noise reduction.

Further, in an embodiment of JP-U No. 1-39103, a rim wheel is structured to have a double bottom, and considered to have a sufficient volume of sub-air chambers. However, since the rim wheel is formed into a configuration whose diameter is smaller than that of a bead baseline or does not have a so-called rim bottom portion, it is impossible for a tire bead to pass a rim flange, and in practice, rim assembly cannot be carried out. Consequently, the rim wheel according to this disclosure cannot be put to practical use.

Further, in JP-U No. 1-39103, requirements in respect of the number of air chambers in a circumferential direction of the rim wheel have not been sufficiently studied. With a single air chamber in an embodiment of this disclosure, improvements are hardly noticeable, and even with two air chambers, sufficient improvements cannot be demonstrated.

JP-A No. 1-115702 also discloses a configuration of a rim wheel having a double bottom. However, no description is given of the number of air chambers (a ring body is not divided in a circumferential direction). In this case, if the rim wheel is a continuous body in a circumferential direction, a problem is caused in that cavity resonance tends to rather increase.

Another embodiment of EP No. 0936083 or of JP-A No. 1-115702 discloses a method in which another hollow structural member is attached to a well portion in an inner radial direction thereof. However, in this case, there is a concern of deteriorations in rotational balance, and in addition, there are other drawbacks such as an increase in the number of manufacturing processes, an increase in weight, and concerns about the reliability of air seals.

EP No. 0936083 also discloses a method in which a hollow structural member is attached to a tire inner liner side of the well portion. Here, however, there is a concern of deteriorations in rotational balance, and in addition, problems occur as a result of an increase in the number of manufacturing processes and an increase in weight. Further, since, in the embodiments of this disclosure, a rim bottom portion is closed, it is difficult for a tire bead portion to pass a rim flange, thus making it extremely difficult to undertake the rim assembly.

In view of the aforementioned facts, an object of the present invention is to provide a rim wheel and a tire rim assembly in which tire cavity resonance can be reduced effectively, to secure improvements in quietness, which is a major requirement for automobiles, and in riding comfort, thus making the rim wheel and the tire rim assembly practical applications.

DISCLOSURE OF THE INVENTION

A first aspect of the present invention is a rim wheel comprising three or more sub-air chambers which are formed between a rim and a plurality of cap members disposed out-wardly in a radial direction of the rim, by no less than three sealed diaphragms which divides one sub-air chamber into three or more sub-air chambers, the one sub-air chamber being defined by the rim and the cap members, the sub-air chambers being discontinued in a rim circumferential direction, and the sealed diaphragms being separated from each other at predetermined intervals in the rim circumferential direction, a concave well portion which is provided at at least one of the rim and the cap members, and has a bottom portion positioned radially inward of a bead seat, and a communicating portion which is provided at each of the cap members thus allowing a tire main air chamber and the sub-air chambers to communicate with each other, characterized in that a Helmholtz resonance noise absorber is constituted by the sub-air chambers and the communicating portion which satisfy the following equation:

$$f_0 = 5411.4 \sqrt{\frac{S}{V(L+0.8\sqrt{S/N})}} \quad [F3]$$
$$= 1.48R^2 - 60.56R + 824.89 \pm 100$$

$f^0$: resonance frequency (Hz)
V: a volume of sub-air chambers (cm$^3$)
S: a total cross-sectional area of communicating portions (cm$^2$)
L: a length of a communicating portion (cm)
N: the number of communicating portions/air chamber
R: a wheel diameter (inch).

Next, an operation of the rim wheel according to the first aspect will be described.

In the rim wheel according to the first aspect, the sub-air chambers are formed between the main body of the rim wheel and the cap members by disposing the cap members outwardly in a radial direction of the rim wheel. The sub-air chambers communicate with the tire main air chamber through the communicating portions and function as the Helmholtz resonance noise absorber.

Since the concave well portion, whose bottom is positioned inwardly in the rim radial direction of the bead seat, is provided at at least one of the rim and the cap members, the tire bead portion can be dropped into the well portion thus allowing a tire to be assembled with the rim in the same manner as in a conventional art.

Further, the well portion of the main body of the rim wheel can be structured to be wider in an axial direction of the rim than in a conventional model, or to be deeper inwardly in a radial direction of the rim.

A structure in which the well portion is formed deep inwardly in a radial direction of the rim means that a difference between diameters of a bead portion and a wheel base portion is large. When a brake has enough space, the difference in diameter can be further increased by decreasing the diameter of the wheel base portion. When the brake does not have enough space, a tire height can be decreased by increasing the diameter of the bead portion (the tire is made to have the same outer diameter). In other words, the difference in diameter between the bead portion and the wheel base portion can be increased by the so-called "inch-up method".

There is no significant constraint in increasing a width of the well portion in a rim axial direction. By means of the increase in the width of the well portion, a required volume of sub-air chambers can be obtained. However, in order to increase the volume of the sub-air chambers as much as possible, it is rather preferred to increase the depth of the well portion inwardly in a rim radial direction.

The rim wheel body can be manufactured inexpensively by using a conventional casting or hammering method.

A plurality of the cap members is connected to an outside portion of the rim wheel in the radial direction and thus forms the sub-air chambers.

After the rim wheel has been connected to the cap members, a profile at the side of the rim to which a tire has been attached can, for example, form a line that follows a known JATMA standard having a well portion.

The cap members can be made by a metal material that is the same as that of the rim wheel body, or they may be made by another metal material or with a synthetic resin.

If both the cap members and the rim wheel are made of the same metal material, preferred method of coupling the cap members and the rim wheel to each other is welding. However, if the cap members and the rim wheel body are made of different materials, preferred method of coupling the cap members and the rim wheel to each other is a fixing method by using bolts, adhesives or engagements.

The communicating portions are formed at each of the cap members, and through communicating portions, the tire main air chamber, sealed between an inner surface of the tire and the rim wheel, and the sub-air chambers communicate with each other.

More specifically, it is convenient and preferable to form in advance communicating portions at each of the cap members.

Alternatively, by disposing each cap member to be separated from each other at predetermined distances in a rim circumferential direction, a slit-shaped communicating portion can be formed.

In this case, it is essential to dispose spacers at both end portions of each cap member or the like, in order to effect alignment of the rim wheel and the cap members with an engagement structure. However, it is possible to reach a target configuration with a minimum number of processes.

Thickness of the cap member is set, depending on the material used for the cap member. However, it is preferable to avoid an increase in a total weight of the cap members by decreasing the thickness of each cap member as far as is possible within a range of rigidity that prevents the cap member from plastically deforming during a tire rim assembly, and prevents it from deforming substantially due to a centrifugal force while a vehicle is travelling. However, since, as will be described later, the thickness of the communicating portion may influence resonance frequency, thickness is a factor that must be determined carefully.

The sub-air chamber is divided into three or more air chambers by no less than three sealed diaphragms so as to be formed discontinuously in a rim circumferential direction.

The sealed diaphragms may be integrated with the main body of the rim wheel or can be an independent structural member which is connected to the main body of the rim wheel or the cap member.

If one sub-air chamber is a continuous body in a rim circumferential direction (namely, if one sub-air chamber is formed into an annular shape), the sub-air chamber does not operate as the Helmholtz resonance noise absorber, and even worse, depending on a circumferential length of the sub-air chamber, cavity resonance of a frequency band may occur. Accordingly, in these circumstances, cavity resonance itself tends to increase, and in consequence none of the effects of the present invention will be obtained.

Further, from the viewpoint of improvements in noise reduction, it is more preferable to seal the diaphragms as tight as possible. Moreover, it is effective to enhance accuracy in setting sizes of the sealed diaphragms and to take measures to seal spaces between the sealed diaphragms and the cap members or between the sealed diaphragms and the main body of the rim wheel.

With regard to the number of divisions (the number of diaphragms) into which the sub-air chamber should be divided in a rim circumferential direction, results of various experiments and studies have revealed that one sub-air chamber should be divided into three air chambers or more.

If the number of sub-air chambers is small, additional time may be required due to an increase in a distance between a tire road-contacting portion as a noise source and a communicating hole as a noise absorbing portion. Accordingly, a delay in noise absorbing by resonance occurs. Consequently, vibration transmitted to a vehicle shaft becomes larger. In these circumstances, it is effective to increase the number of diaphragms. On the other hand, it is not effective, for example, merely to scatter the communicating portions in the rim circumferential direction.

The number of sub-air chambers is preferably four or more, and more preferably, five or more.

In order to avoid deterioration in rotational balance, it is preferable that the respective sealed diaphragms are set to the same size and positioned at circumferentially equal distances.

The thickness of the sealed diaphragm is not particularly limited, and can be formed by the same material as that of the rim wheel, such as aluminum, iron or the like, as long as the sealed diaphragm is formed integrally with the main body of the rim wheel.

Alternatively, from the viewpoint of improvements in sealability, a material which is provided with compressibility and low specific gravity, such as rubber, can preferably be used.

In accordance with the aforementioned equation, it is necessary to set accurately sizes such as a volume of the sub-air chamber, and a cross-sectional area and a length of the communicating hole (see FIG. 37: a volume of a sub-air chamber V ($cm^3$), a total cross-sectional area of the communicating hole S ($cm^2$), and a length of the communicating hole L (cm)).

The left-hand term in the aforementioned equation expresses the frequency of Helmholtz resonance.

The basic equation is described in various engineering text books, but the term for correcting opening ends varies, depending on these books.

A formula suitable for the structure of the present invention was obtained as a result of experiments, thus resulting in the aforementioned equation.

Further, cavity resonance frequency inside the tire main air chamber depends on the circumferential lengths of a tire and a rim. The smaller the diameter of a tire, the larger the frequency, and the larger the diameter of the tire, the smaller the frequency.

The right-hand term in the aforementioned equation is an optimal range of frequency that has been set on the basis of a tire size and a rim diameter.

Various sizes can be set on the basis of the aforementioned equation, and effective reduction of cavity resonance can accordingly be attained.

Specifically, at first, a rim diameter is determined. Thereafter, as shown in FIG. 37, a sub-air chamber volume V($cm^3$), a communicating hole total cross-sectional area S($cm^2$), a communicating hole length L(cm), and the number of communicating holes N are determined, whereby a rim wheel capable of effectively reducing cavity resonance of a tire can be obtained.

Since the present invention has been structured as described above, a sufficient volume of sub-air chambers required to secure reductions in cavity resonance can be obtained.

Further, sizes are respectively set within an optimal range, and the sub-air chamber is divided by the sealed diaphragms into three or more sub-air chambers in the rim circumferential direction, thus making it possible to reduce tire cavity resonance effectively.

The present invention has been structured such that the cap members are disposed between the rim wheel body and the tire so as to form the sub-air chambers. Accordingly, there is no need for concern about the occurrence of air leakage (decreases in internal pressure).

Since the cap members, which are manufactured separately from the main body of the rim wheel, are simply coupled thereto, increases in the number of manufacturing processes, manufacturing costs and machine weight can all be kept to a minimum, and rotational balance can be secured at the same level as that in a conventional art.

After the rim wheel body and the cap members have been connected to one another, the rim wheel can be formed into the same profile as in a conventional rim wheel. Accordingly, rim assembly and rim disassembly of a tire can be carried out in the same manner as in a conventional art.

Further, in the present invention, the internal volume of the rim wheel into which air flows becomes larger than in a normal rim wheel by a volume of the sub-air chambers, and a spring constant of a tire accordingly becomes lower.

For this reason, when big impacts caused by differences of level, or by protrusions, on a road surface are received, the effects on the riding comfort of a passenger are relatively mild.

Moreover, when a tire is deformed, the damping effects on vibration are intensified, due to resistance generated when air passes through the communicating holes, and riding comfort consequently improves.

On the other hand, because of the aforementioned resistance, a spring constant in response to quick movements is hardly reduced. Accordingly, steering stability can be ensured at the same level.

Since the rim wheel and the tire rim assembly of the present invention are structured as described above, excellent effects can be obtained that a tire can be assembled in a conventional manner, and riding comfort and quietness, which are essential requirements for automobiles, can be enhanced.

In a second aspect of the present invention, the cap members are kept in close contact with each other, the cap members and the rim are kept in close contact with each other, and the sub-air chambers and the tire main air chamber are made to communicate with each other, simply through holes as the communicating portions formed at each of the cap members.

Next, an operation of the rim wheel according to the second aspect will be explained.

In the rim wheel according to the second aspect, for example, setting of resonance frequency can be changed simply by adjusting a diameter, or the number of, the communicating holes. Accordingly, an improved degree of freedom is secured with respect to the size of tires having different cavity resonance frequencies. Accordingly, the adverse effects of mistakes in measurement and attachment processes can be minimized.

By providing the cap members with a sliding structure, by means of welding or sealing between the cap members, or by making differences of step at the end portions of each cap member, the formation of gaps in a rim circumferential direction can be prevented. In consequence, noise absorption loss caused by gaps can be prevented, thus making it possible to secure a high level of noise absorption.

In a third aspect of the present invention, in a tire axial direction, a length of a gap between a position closest to a tire axial center of the communicating portion and an inner surface of the sub-air chamber at a rim wheel side is equal to or more than 5 mm.

Next, an operation of the rim wheel according to the third aspect will be explained.

According to results studied by the present inventors, a length of a gap in a tire radial direction between a position closest to a tire axial center of the communicating portion and an inner surface of the sub-air chamber at the rim wheel side is equal to or more than 5 mm, and it was noted that cavity resonance can thus be considerably reduced.

Here, the length of a gap between the position closest to the tire axial center of the communicating portion and the inner surface of the sub-air chamber at the rim wheel side is a rim radial direction depth D of a sub-air chamber 102 measured from an end portion of a communicating hole 100, as shown in FIG. 38.

As the length of a gap becomes smaller than 5 mm, the effects of noise reduction also decrease. This is because the inner surface of the sub-air chamber at the rim wheel side is positioned too close to the communicating portion, which functions as an inlet of noise from the tire main air chamber. In this case, the influence of reflecting waves from the inner surface of the sub-air chambers at the rim wheel side is increased. Accordingly, the sub-air chambers fail to operate as the Helmholtz resonance noise absorber.

As described below in detail, when the communicating portions are processed as shown in FIGS. 8 to 10, careful attention should be paid to the dimensions thereof. By designing the communicating portions so as to reliably obtain sufficient depths of the sub-air chambers in a tire axial direction, high level of noise reduction of cavity resonance can be demonstrated.

In a fourth aspect of the present invention, the communicating portion is formed at a position separated in a tire circumferential direction by 30 mm or more from the sealed diaphragms corresponding to both ends of the sub-air chamber, and separated in a tire widthwise direction separated by 15 mm or more from the side walls corresponding to both ends of the sub-air chamber.

Next, an operation of the rim wheel according to the fourth aspect will be explained.

In a Helmholtz resonance noise absorber, a resonance frequency is determined on the basis of a balance at which the communicating portions and the sub-air chamber are set.

For example, at a position in a circumferential direction of a tire, when the communicating portions are disposed at end portions of each sub-air chamber, i.e., at positions adjacent to the sealed diaphragms, a portion of the communicating portions and the sealed diaphragms become attached to each other. Therefore, the length of each communicating portion is made larger, which influences the resonance frequency. Consequently, the sub-air chambers fail to function as a noise absorbing resonator.

It is preferable to form the communicating holes at a certain distance from the sealed diaphragms, although the distance may vary depending on the size of the sub-air chamber. Namely, in the tire circumferential direction, by disposing the communicating portion at a position separated by 30 mm or more from the sealed diaphragms, a substantial degree of reduction in cavity resonance can be demonstrated.

In other words, it is preferable to scatter the communicating portions in the central vicinities of the sub-air chamber.

Also, for the same reasons, in the tire widthwise direction, it is necessary to dispose the communicating portions at positions separated by 15 mm or more from the side wall portions corresponding to both end portions of the sub-air chamber.

The value difference between the tire circumferential direction and the tire widthwise direction occurs because a tire is more round in a circumferential direction, has R, and is more easily influenced by R. It has been confirmed by experiments that separating a communicating hole in the tire circumferential direction from the sealed diaphragms achieves a better result than separating the communicating hole in the widthwise direction from the side wall portions.

In a fifth aspect of the invention, three holes or more that function as the communicating portions are formed at each of the cap members.

Next, an operation of the rim wheel according to the fifth aspect will be explained.

A single hole is sufficient for the operation, but, with three or more communicating holes, a cross-sectional area per one hole becomes smaller when the same resonance frequency is set, and air resistance increases. As a result, the damping effects on vibration are improved.

In a sixth aspect of the present invention, both end edge portions in the rim circumferential direction of the cap member are inclined surfaces inclining in the same direction, and the respective inclined surfaces of one cap member and another cap member, which are adjacent to each other, are kept in close contact with one another.

Next, an operation of the rim wheel according to the sixth aspect will be explained.

In a state in which the cap members are connected to each other in the rim circumferential direction, the respective inclined surfaces of one cap member and another cap member, which are adjacent to each other, are kept in close contact with one another. Accordingly, the spaces between the cap members become sealed.

The cap members oppose each other such that the inclined surface facing inwardly in the rim radial direction covers the inclined surface facing outwardly in the rim radial direction. Accordingly, when the cap members are mounted to the rim by using screws, sealability is improved.

Further, since both end edges of one cap member are inclined surfaces in the rim circumferential direction, if any errors in measurement occur between the cap members in the rim circumferential direction, sealability between the cap members can still be reliably obtained.

In a seventh aspect of the present invention, the rim wheel includes a first step portion, which is parallel to an outer circumferential surface of the cap member, formed at one end edge side of the cap member in the rim circumferential direction, positioned inwardly in a rim radial direction of the outer circumferential surface, and faces outwardly in the rim radial direction, and a second step portion, which is in parallel to an inner circumferential surface of the cap member, formed at the other end edge side of the cap member in the rim circumferential direction, positioned outwardly in a rim radial direction of the inner circumferential surface, and faces inwardly in the rim radial direction, characterized in that at least portions of the first step portion and the second step portion of each of the cap members adjacent to each other in the rim circumferential direction are kept in close contact with one another in the rim widthwise direction.

Next, an operation of the rim wheel according to the seventh aspect will be explained.

In a state in which the cap members are connected to each other in the rim circumferential direction, at least portions of the first step portion and the second step portion, of each of the cap members adjacent to each other, are kept in close contact with each other in the rim widthwise direction, and accordingly, the cap members are sealed therebetween.

The cap members oppose each other such that the second step portion facing inwardly in the rim radial direction covers the first step portion facing outwardly in the rim radial direction. Accordingly, when the cap members are mounted to the rim by using screws, sealability is improved.

Further, since at least portions of the first step portion and the second step portion are kept in close contact with each other in the rim widthwise direction, if any errors in measurement occur in the rim circumferential direction of the cap members, sealability between the cap members can be secured.

In an eighth aspect of the present invention, a total volume of the sub-air chambers is equal to or more than 2% and equal to or less than 25%.

Next, an operation of the rim assembly according to the eighth aspect will be explained.

Next, an operation of the rim assembly according to claim 8 will be explained.

When the total volume of the sub-air chambers is less than 2% of the volume of the tire main air chamber, the reduction effect in cavity resonance and the improvement in riding comfort are adversely affected.

On the other hand, if the total volume of the air chambers exceeds 25% of the volume of the tire main air chamber, a spring constant of a tire becomes too low, thereby reducing the damping performance of vibration and causing a deterioration in steering stability, which is not preferable.

Further, it is more preferable that the total volume of the sub-air chambers is 3 to 15% of the volume of the tire main air chamber.

In a ninth aspect of the present invention, a compression rate of a tire is equal to or less than 60%.

Next, an operation of the tire rim assembly according to the ninth aspect will be explained.

Generally, in a tire having a low compression rate, in order to increase a hoop tightening effect, a belt reinforcing layer other than a belt layer is used so that modulus of elasticity of a tread region in a tire circumferential direction is increased.

With such a tire, conventionally, an increase in cavity resonance level is likely to cause a problem. However, if such a tire is used in combination with a wheel of the present invention, it is possible to produce a tire rim assembly capable of providing both high steering stability and sufficient quietness.

In a tenth aspect of the present invention, the tire has a belt reinforcing layer which is wound around the tire in a spiral state, and the belt reinforcing layer uses an organic fiber whose tensile modulus of elasticity is 6 GPa or more.

Next, an operation of the tire rim assembly according to the tenth aspect will be explained.

If a tire comprising a spiral-shaped belt reinforcing layer having high modulus of elasticity is used, tire road noise can be improved while cavity resonance is not improved.

As a result, cavity resonance increases even more, and this can lead to uncomfortable riding.

However, when such a tire is used with the wheel of the present invention, noise in a wide frequency band can be reduced uniformly, and the tire rim assembly having a high level of quietness is made possible. Examples of organic fibers having elasticity of 6 GPa or more include polyethylene phthalate, aramido (kepler) and the like.

BRIEF DESCRIPTION OF THE DRAWINGS

FIG. 4A is a plan view of a portion of a cap member of a rim wheel according to a second embodiment of the present invention, and FIG. 4B is a side view of the rim wheel according to the second embodiment of the present invention as seen from a direction orthogonal to an axis of the rim wheel;

FIG. 5A is a cross-sectional view of a main portion of a rim wheel according to a third embodiment of the present invention and a tire, along a rotational axis thereof, and FIG. 5B is an enlarged cross-sectional view of a vicinity of a bead seat;

FIG. 12 is a cross-sectional view of a main portion of a rim wheel according to a fourth embodiment of the present invention and a tire, along a rotational axis thereof;

BEST MODE FOR CARRYING OUT THE INVENTION

First Embodiment

Figure 1A:
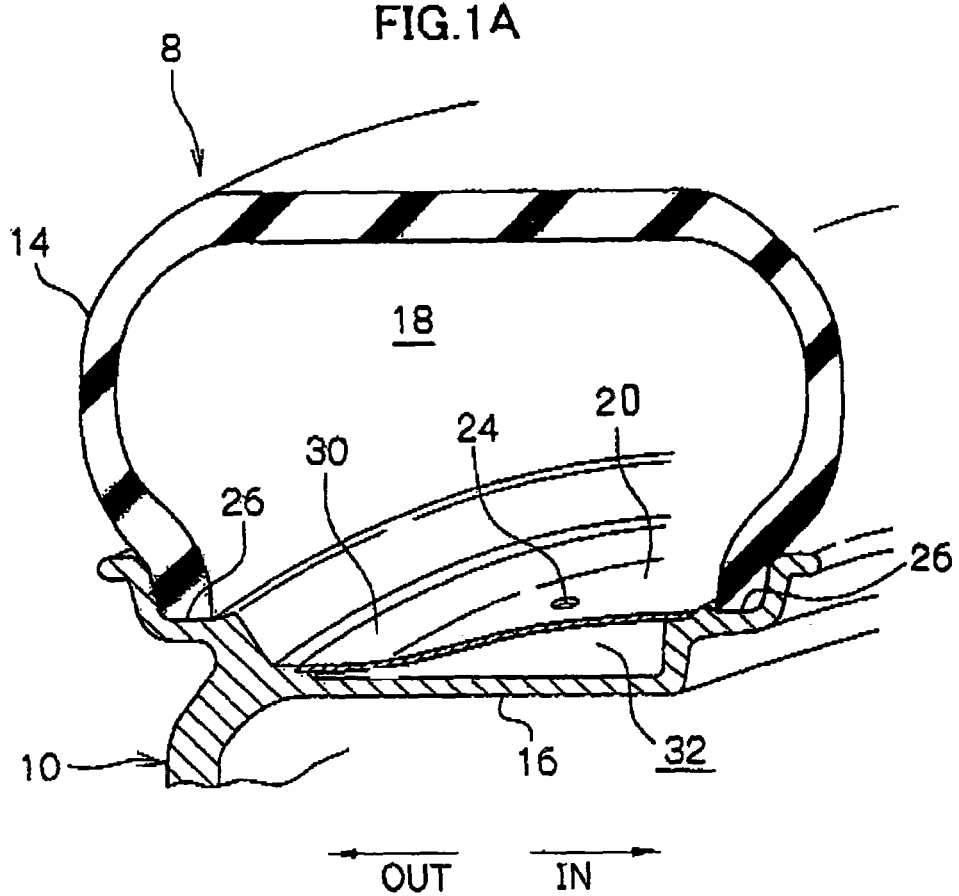
FIG. 1A is a cross-sectional view of a main portion of a rim wheel according to a first embodiment of the present invention and a tire, along a rotational axis thereof.
Figure 1B:
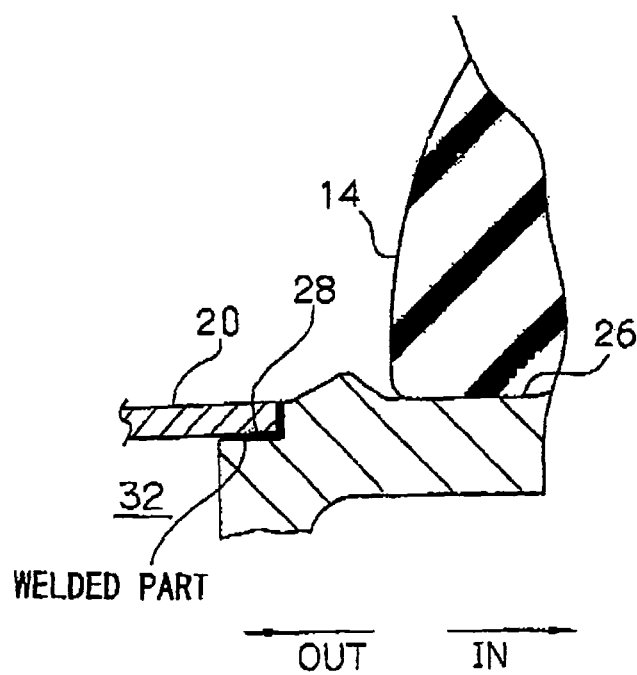
FIG. 1B is an enlarged cross-sectional view of a vicinity of an end portion of a cap member.
Figure 2:
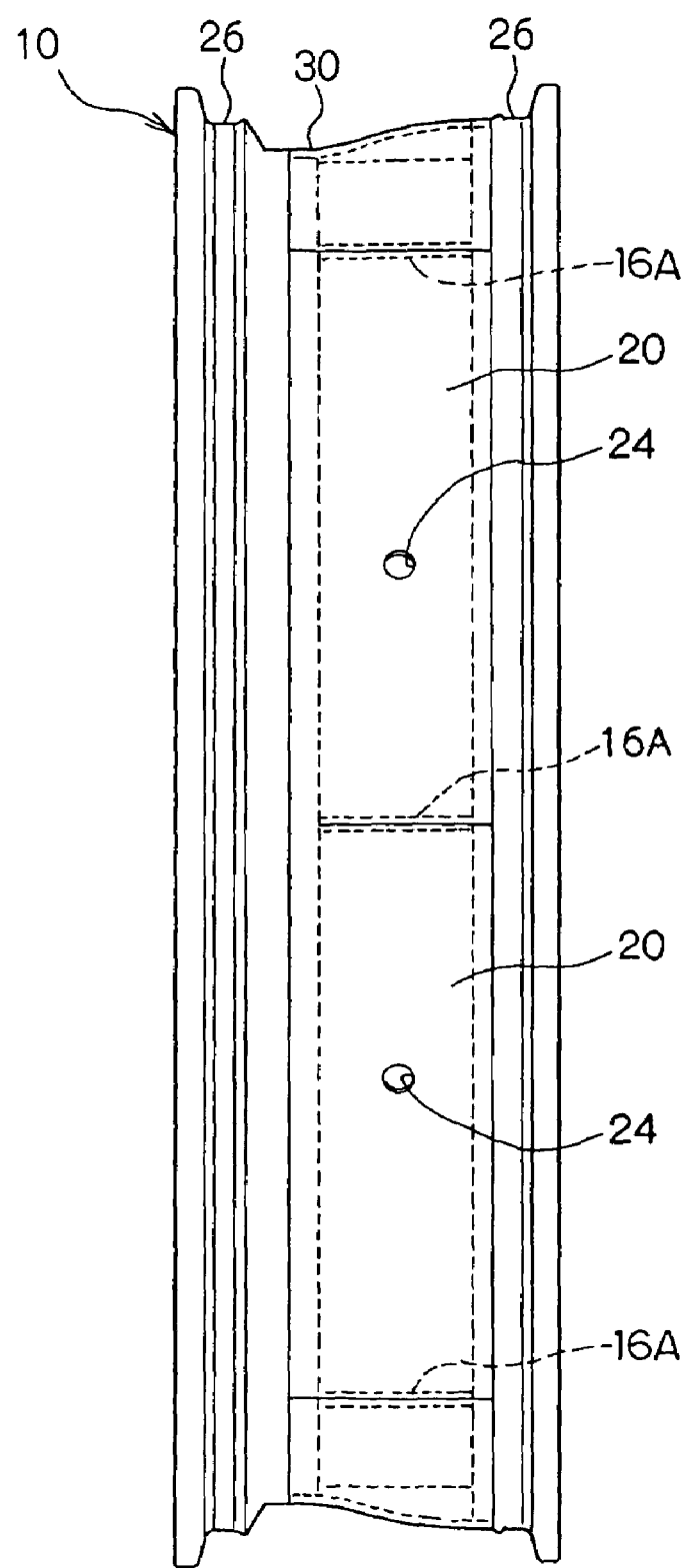
FIG. 2 is a side view of the rim wheel according to the first embodiment of the present invention as seen from a direction orthogonal to an axis of the rim wheel.

With reference to FIGS. 1 to 3, a description of a tire rim assembly according to a first embodiment of the present invention will be made.

As shown in FIG. 1A, in a tire rim assembly 8 of the present embodiment, a tire 14 is attached to a rim 16 of a rim wheel 10.

A sealed tire main air chamber 18 is formed between the tire 14 and the rim 16.

Figure 3A:
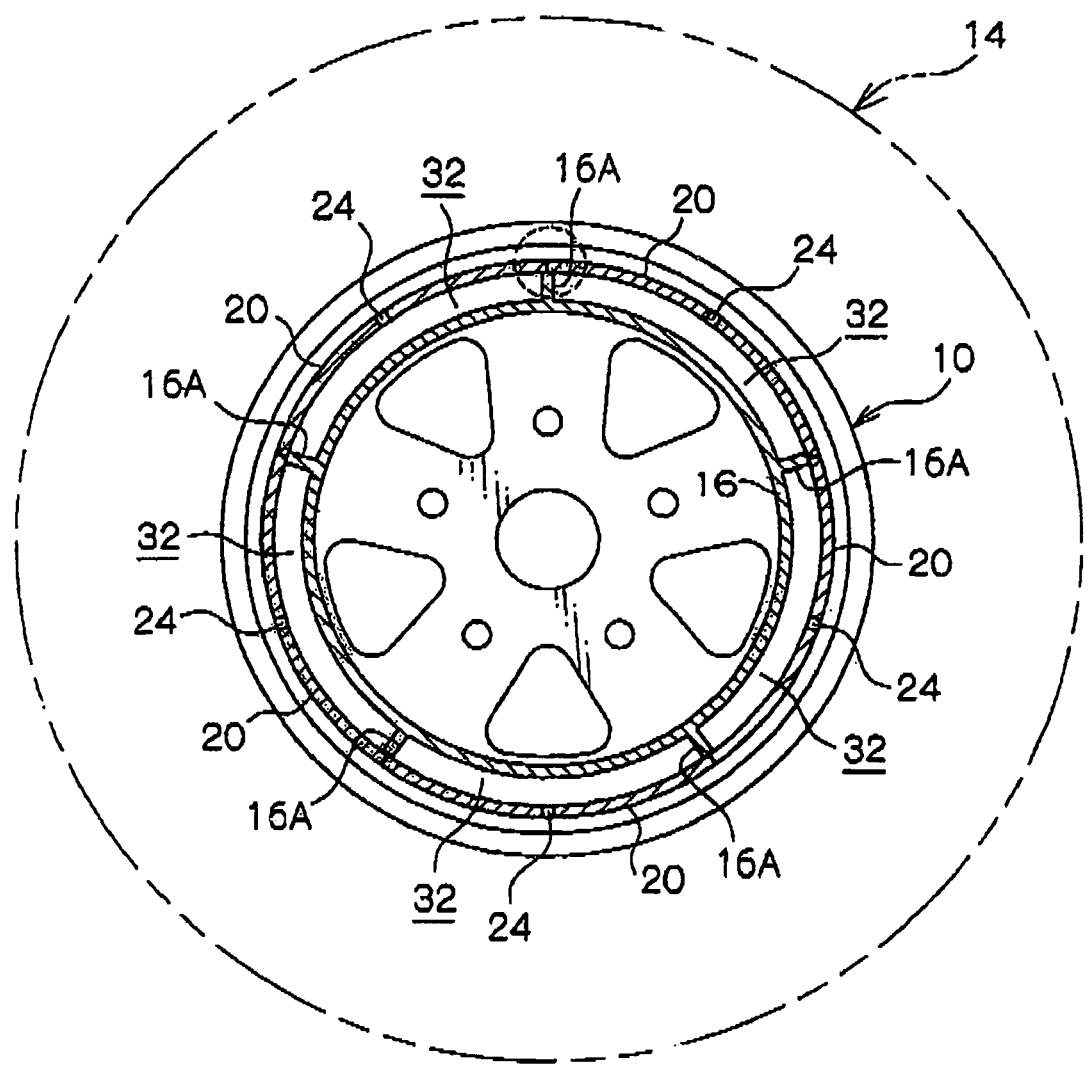
FIG. 3A is a cross-sectional view of the rim wheel according to the first embodiment of the present invention as seen from a direction orthogonal to an axis of the rim wheel.

As shown in FIGS. 1A, 2 and 3A, a plurality of cap members 20 (five in the present embodiment) is disposed at an outer circumferential portion of the rim 16 in a circumferential direction of the rim 16 (rim circumferential direction, hereinafter).

Each of the cap members 20 of the present embodiment is formed by press-processing a substantially rectangular plate member (aluminum plate having a thickness of 0.2 cm) made by the same metal as that of the rim wheel 10. Each cap member 20 is bent along the outer circumferential surface of the rim 16 in a rim circumferential direction, and a portion of the cap member 20 is also bent in a widthwise direction of the rim 16 (rim widthwise direction, hereinafter).

Figure 3B:
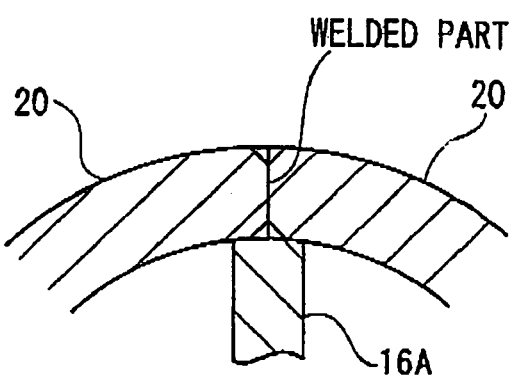
FIG. 3B is a partially enlarged cross-sectional view of a dotted circled portion taken from FIG. 3A.

As shown in FIGS. 2 and 3B, end portions of the cap members 20 in a rim circumferential direction are butt-welded to each other at portions of diaphragms 16A that will be described later.

As shown in FIGS. 1A and 1B, one end portion of the cap member 20 in a rim widthwise direction engages with a step portion 28 formed at a bead seat 26 at a rear side of the rim 16 (at an arrow IN direction side), and is welded thereto.

The other end portion of the cap member 20 in the rim widthwise direction is welded to an outer circumferential surface of the rim 16, that is closer to a front side of the rim 16 (at an arrow OUT direction side) than a central portion in the rim widthwise direction.

Here, a concave well portion 30 is formed between the other end portion of the cap member 20 and the front side of the rim 16 so as to drop a tire bead portion therein during attachment of a tire.

A bottom portion of the well portion 30 is positioned inwardly of the bead seat 26 in a tire radial direction.

The outer circumferential surface of the cap member 20, and the outer circumferential surface of the rim 16 (portions of the rim 16 that are not covered with the cap members 20), are respectively formed into the same configurations as those defined in an ordinary JATMA standard, for example.

As shown in FIG. 3A, a ring-shaped space that is formed between the rim 16 and the cap members 20 is divided by five diaphragms 16A into five sub-air chambers 32 in the rim circumferential direction. The five diaphragms are vertically disposed on the outer circumferential surface of the rim 16 at positions separated from each other by equal distances.

An outer end portion of each of the diaphragms 16A in a tire radial direction is kept in close contact with the cap member 20 thus making each of the sub-air chambers 32 completely isolated.

One communicating hole 24 is formed at each cap member 20 for each sub-air chamber 32, and the sub-air chamber 32 is made to communicate with the tire main air chamber 18 through the communicating hole 24.

In the present embodiment, the sub-air chambers and the communicating holes 24 form a Helmholtz resonance noise absorber.

Here, respective portions of the tire rim assembly 8 are determined so as to satisfy the following equation.

[F2]

$$f_0 = 5411.4 \sqrt{\frac{S}{V(L+0.8\sqrt{S/N})}}$$
$$= 1.48R^2 - 60.56R + 824.89 \pm 100$$

$f_0$: resonance frequency (Hz)
V: a volume of a sub-air chamber (cm$^3$)
S: a total cross-sectional area of communicating holes (cm$^2$)
L: a length of a communicating hole (cm)
N: the number of communicating holes/sub-air chambers
R: a wheel diameter (inch)

In the present embodiment, a resonance frequency is set at about 250 Hz.

Further, a total inner volume of the sub-air chambers 32 for one rim wheel 10 is preferably equal to or more than 2% and equal to or less than 25% of a volume of the tire main air chamber 18, and more preferably, equal to or more than 3% and equal to or less than 5% thereof.

A volume of the tire main air chamber 18 when a tire 14 (195/55R15) is attached to the rim wheel 10 (6JJ15) of the present embodiment is about 22000 cm$^3$, a total volume of five sub-air chambers 32 is 1500 (300 cm$^3$×5) cm$^3$, and a total volume of five sub-air chambers 32 is 6.8% of a total volume of the tire main air chamber 18.

The tire 14 of the present embodiment is a so-called pneumatic radial tire, and further has a belt reinforcing layer in which a strip member having a comparatively narrow width is wrapped around the radially outer surface of a belt.

The strip member has a plurality of polyethylene naphthalate codes arranged in parallel to one another.

It is preferable to use polyethylene naphthalate, aramido (kepler) or the like whose tensile modulus of elasticity is 6 GPa or more as an organic fiber code. This is firstly because road noise in a frequency band other than cavity resonance noise can be reduced, and secondly, when the code is incorporated into the tire rim assembly, the resulting tire rim assembly reduces noise in various frequencies.

(Operation)

Next, an operation of the rim wheel 10 according to the present embodiment will be explained.

Since the tire main air chamber 18, which is constituted by the tire 14 and the rim wheel 10, is connected to the sub-air chambers 32 via the communicating holes 24, an inner volume of the tire main air chamber 18, into which the air flows, becomes larger than that of an ordinary combination product of a tire and a rim wheel, by a volume of the sub-air chambers 32. As a result, a spring constant of the tire 14 decreases mainly in a radial direction.

Therefore, when big impacts are received when a vehicle passes over differences in level or protrusions on a road surface, with the rim wheel 10 of the present embodiment, the effects on riding comfort are relatively mild.

Since the tire main air chamber 18 and the sub-air chambers 32 communicate with one another through comparatively narrow communicating holes 24, when impacts with a high frequency band are exerted thereon, due to the resistance of the communicating holes 24, the rim wheel 10 according to the present embodiment can reveal characteristics close to a spring constant corresponding merely to the inner volume of the tire main air chamber 18.

Therefore, while a vehicle is travelling at high speed, characteristics become similar to those of an ordinary combination product of a tire and a rim wheel in which the sub-air chambers 32 are not provided, and accordingly, good steering stability can reliably be obtained.

Further, due to the fluid resistance of the communicating holes 24, deterioration in vibration damping time can be controlled, and an overall sensation of riding comfort can be improved.

With respect to road noise, the sub-air chambers 32 are divided by the diaphragms 16A and are not formed in an annular shape which is continuous in a rim circumferential direction. The sub-air chambers 32 have a resonance noise absorbing structure referred to as a "Helmholtz resonance noise absorber". Accordingly, vibration of a specified frequency (near 250 Hz in the present embodiment) can be absorbed to reduce noise inside a vehicle.

Since the sub-air chamber 32 is not formed in an annular shape that is continuous in a rim circumferential direction, the occurrence of cavity resonance within the sub-air chamber 32 can be prevented.

Since the concave well portion 30 is formed at the rim wheel 10, the bead portion of the tire 14 can be dropped into the well portion 30 to make a rim assembly of the tire 14 in a conventional manner possible.

In the present embodiment, since a spiral shaped belt reinforcing layer with high modulus of elasticity is used for the tire 14, road noise can be alleviated and further reduced.

If a total volume of the sub-air chambers 32 is less than 2% of a volume of the tire main air chamber 18, reduction of cavity resonance and improvements in riding comfort may be hampered.

On the other hand, when the total volume of the sub-air chambers 32 exceeds 25% of the volume of the tire main air chamber 18, a tire spring constant becomes low, and in consequence the quality of vibration damping and steering stability deteriorate, which is not preferable.

It is more preferable that the total volume of the sub-air chambers 32 is 3 to 5% of the volume of the tire main air chamber 18.

Second Embodiment

Next, with respect to FIG. 4, a rim wheel according to a second embodiment of the present invention will be explained. Portions identical to those shown in the previous embodiment are denoted by the same reference numerals, and a description thereof will be omitted.

As shown in FIG. 4B, the rim wheel 10 of the present embodiment uses cap members 34 having a different configuration to that in the first embodiment of the present invention.

As shown in FIG. 4A, a pair of protruding positioning spacers 34A is formed at a rim circumferential directional one end portion of the cap member 34 along a widthwise direction of the cap member 34.

As shown in FIG. 4B, the respective end portions on one side of a plurality of these cap members 34 are abutted to the respective end portions on the other side of the adjacent cap members 34 by way of the positioning spacers 34A. Accordingly, a gap 36 having a constant width W (0.2 cm in the present embodiment) is formed between the cap members 34.

In the present embodiment, since the tire main air chamber 18 and the sub-air chambers 32 are made communicate with each other through narrow gaps 36, when impacts of a high frequency band are received, due to resistance on the part of the gap 36, the rim wheel 10 according to the second embodiment can provide characteristics close to those having a spring constant obtained when the inner volume is constituted of only the tire main air chamber 18.

Accordingly, when a vehicle is travelling at high speed, characteristics become almost similar to those of an ordinary combination product of a tire and a rim wheel, which lacks the sub-air chambers 32, and steering stability can accordingly be maintained.

Other operations and effects are the same as those in the first embodiment of the present invention.

Third Embodiment

Next, with reference to FIGS. 5 to 7, a rim wheel according to a third embodiment of the present invention will be explained. In the present embodiment, portions identical to those shown in the previous embodiments are denoted by the same reference numerals, and a description thereof will be omitted.

Figure 6:
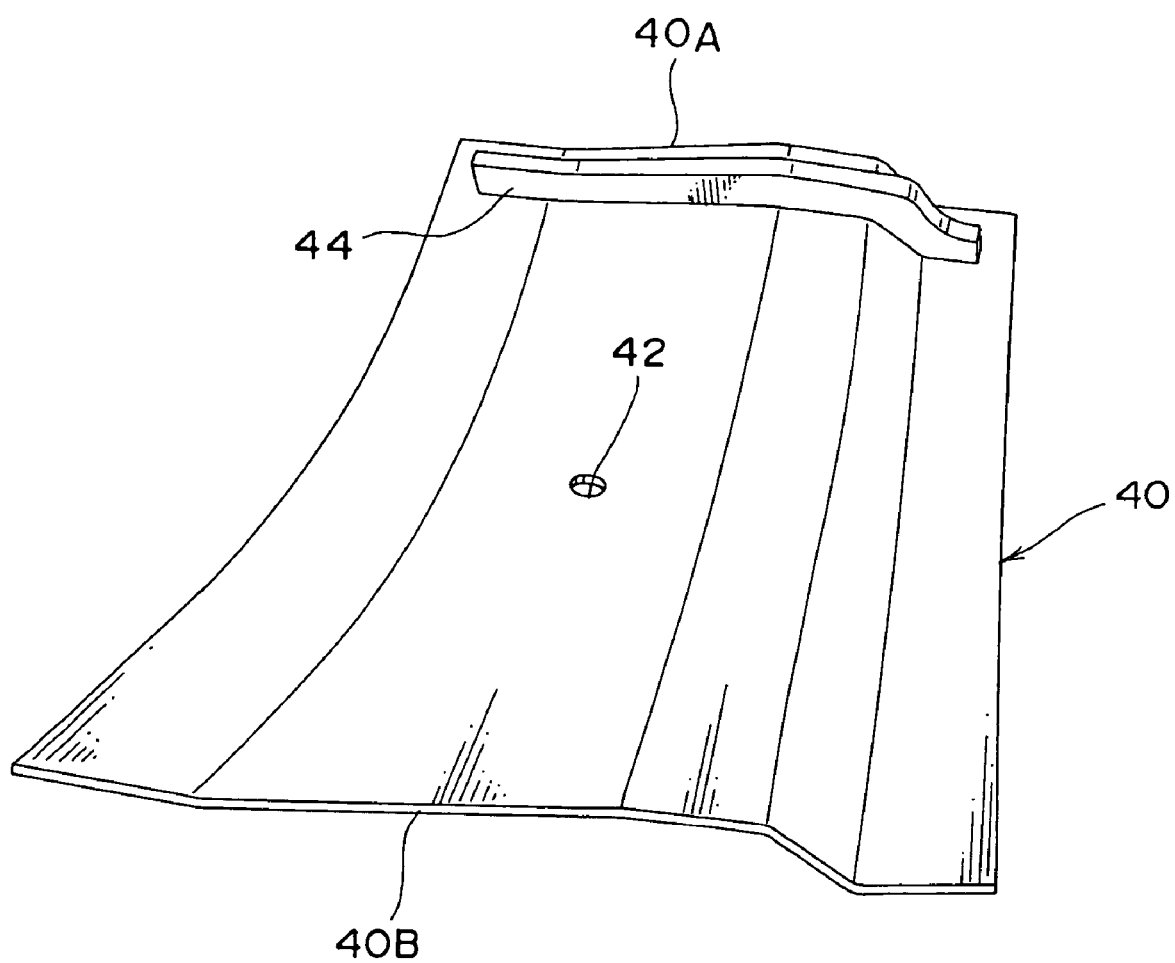
FIG. 6 is a perspective view of a cap member used for the rim wheel according to the third embodiment of the present invention.

As shown in FIGS. 5A and 6, the rim wheel 10 of the present embodiment uses a plurality of cap members 40 which are formed into a curved configuration different to those of the cap members 20 and 34 respectively in the first and second embodiments of the present invention.

Each of the cap members 40 of the present embodiment is provided so as to span both of the bead seats 26 of the rim wheel 10, and is mounted to the bead seats 26 by screws 41 as shown in FIG. 5B.

As shown in FIG. 6, a circular communicating hole 42 is formed at a central portion of each cap member 40.

Figure 7:
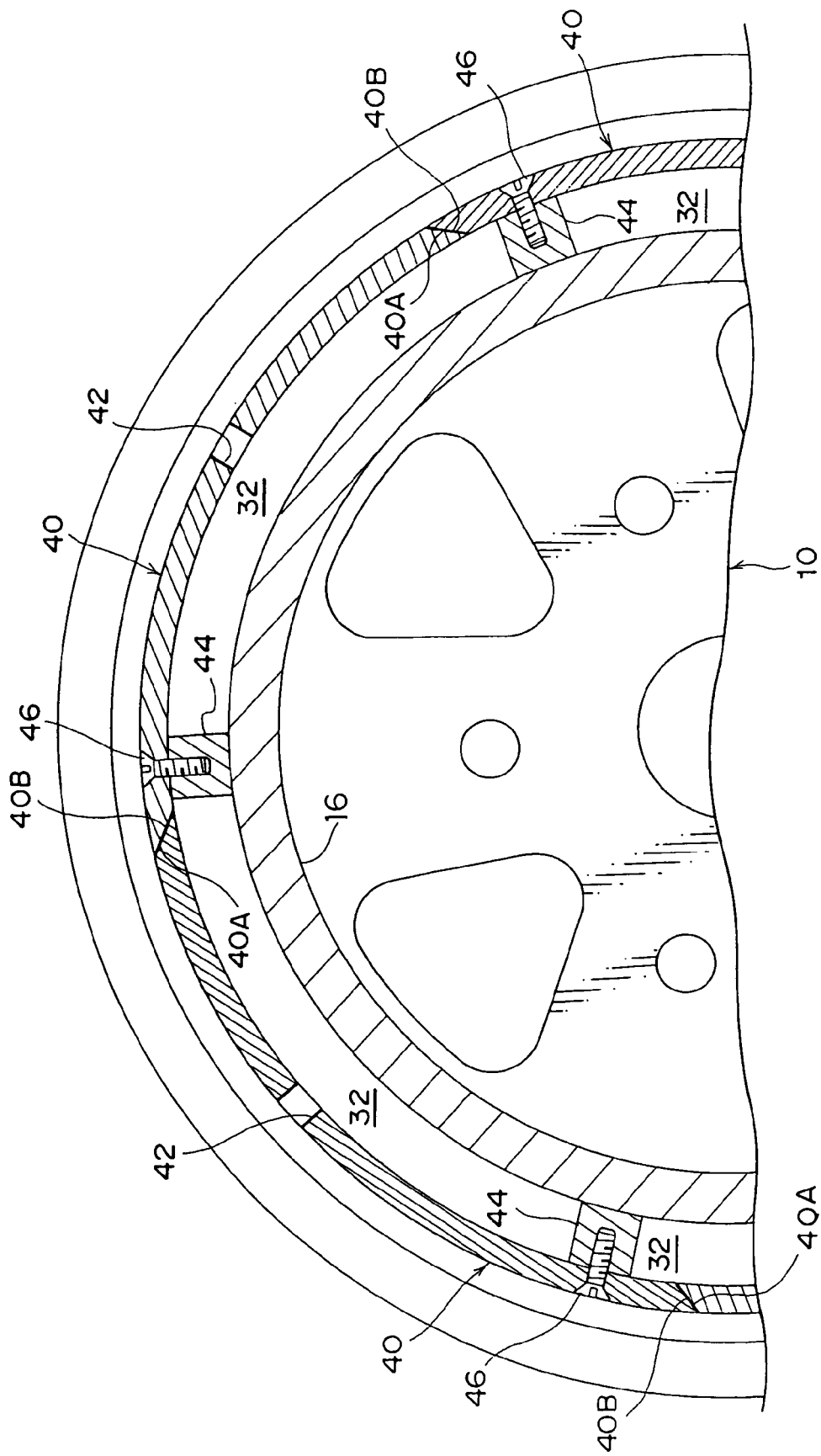
FIG. 7 is a cross-sectional view of the rim wheel according to the third embodiment of the present invention, in a direction orthogonal to the axis of the rim wheel.

As shown in FIGS. 6 and 7, a diaphragm 44 is fixed by a screw 46 to one end of the cap member 40 in a circumferential direction of an inner circumferential surface (i.e., a surface at the rim wheel side).

As shown in FIG. 7, one end edge portion 40A and another end edge portion 40B, viewed in a rim circumferential direction, are respectively formed into inclined surfaces.

In the case of the cap member 40 having vertical (with respect to the rim circumferential direction) end edge portions 40A and 40B, dimensional errors in the rim circumferential direction of the cap member 40 can cause a gap to be formed between the cap members 40 (conversely, if the end edge portions 40A and 40B are elongated so as not to form a gap between the cap members 40, a portion of the cap member 40 can float away). In order to prevent air leakage, the gap must be filled with a sealant or the like. However, in the present embodiment, the end edge portions 40A and 40B in the rim circumferential direction of the cap member 40 are respectively formed by the inclined surfaces, and even if some errors in measurement occur in the rim circumferential direction of the cap members 40, the end edge portion 40A and the end edge portion 40B of the cap members 40 adjacent to each other can be reliably kept in close contact with each other, as shown in FIG. 7.

In other words, in the case of the cap members 40 being fixed to the rim 16 by using screws, it is preferable that the end edge potions 40A and 40B viewed in the circumferential direction of the cap member 40 are respectively formed by the inclined surfaces.

Other operations and effects are the same as those in the first embodiment of the present invention.

Further, when a communication hole 42 is formed, it is preferable to avoid a portion of each of the cap member 40 where a distance between the inner circumferential surface of the cap members 40 and the outer circumferential surface of the rim 16 is equal to or less than 5 mm.

If the communicating hole 42 is formed on the cap member 40 at a portion where a distance between the inner circumferential surface of the cap members 40 and the outer circumferential surfaces of the rim 16 is equal to or less than 5 mm, noise is reflected from the outer circumferential surface of the rim, thus hampering reduction of cavity resonance, which is not preferable.

Further, it is preferable that the communicating hole 42 is formed in a central vicinity region of the sub-air chamber 32 in a rim circumferential direction.

The central vicinity region is a region (hatched portion in FIG. 11A) that is separated from the diaphragms 44 of the sub-air chamber 32 in the rim circumferential direction by 30 mm or more, and in a rim widthwise direction separated 15 mm or more from both side walls 16B of the rim 16, which form inner walls of the sub-air chamber 32 of the rim 16 (more specifically, from points where the cap members 40 and the side walls 16B make contact). In the rim circumferential direction, in particular, it is preferable that the central vicinity region is positioned so as to be separated by an equal distance from the diaphragms 44 at both ends of the sub-air chamber 32, i.e., positioned in the vicinity of the center region, in the rim circumferential direction, of the sub-air chamber 32.

Incidentally, in the case of the cap member 40 being a metal press mold product, and the communicating hole 42 being formed by a punch or a drill, a length of the communicating hole 42 corresponds to a thickness of the metal plate.

In order to control fuel consumption, or reduce the unsprung weight of a vehicle, it is preferable to decrease a plate thickness of the cap member 40 and make the cap member 40 light.

Figure 8:
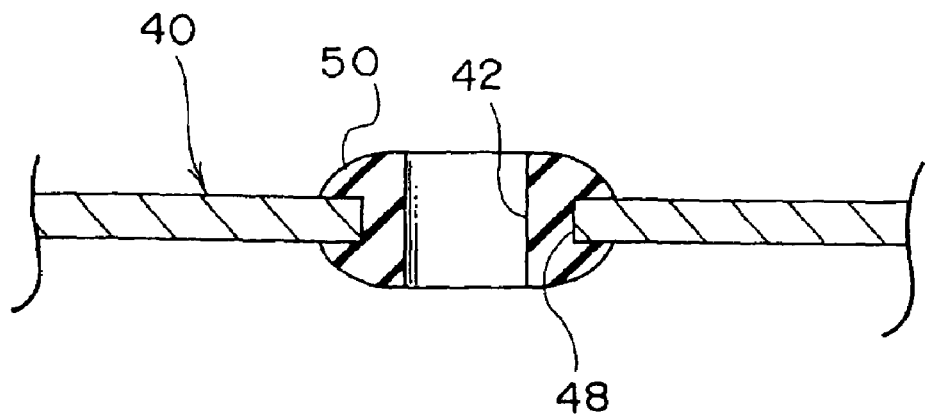
FIG. 8 is a cross-sectional view of a cap member according to another embodiment of the present invention.
Figure 9:
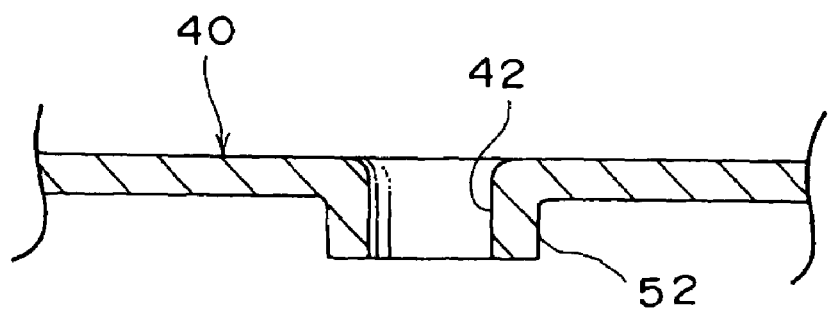
FIG. 9 is a cross-sectional view of a cap member according to still another embodiment of the present invention.

In order to obtain a desired resonance frequency, a length of the communicating hole 42 can be made larger than a plate thickness of the cap member 40, by, for example, attaching a grommet 50 such as a rubber or the like to a hole 48 formed on the cap member 40, as shown in FIG. 8, or applying a barring process 52 as shown in FIG. 9.

Figure 10:
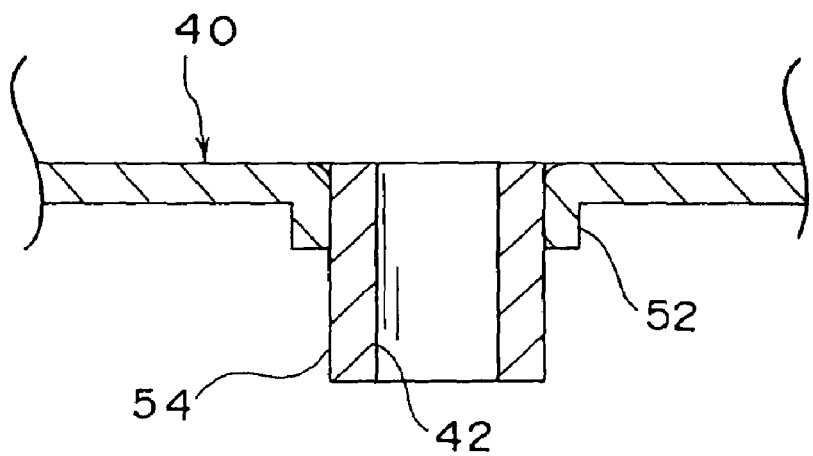
FIG. 10 is a cross-sectional view illustrating a cap member according to yet another embodiment of the present invention.

Further, as shown in FIG. 10, by attaching a pipe 54 to the cap member 40, it becomes possible to make the communicating hole 42 even longer.

Figure 11A:
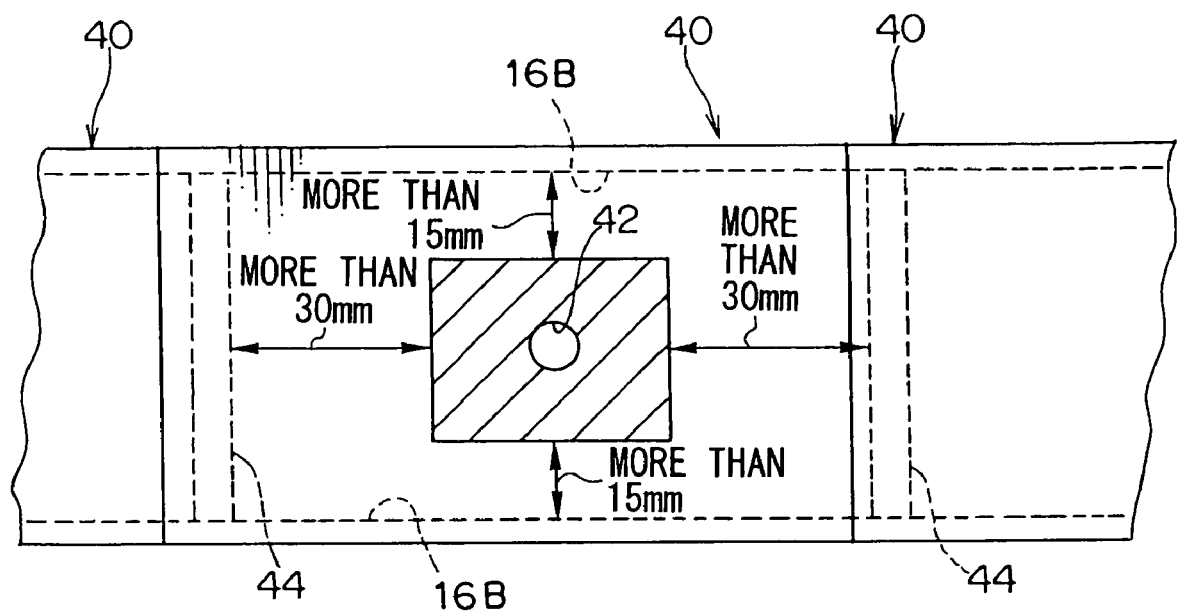
FIG. 11A is a plan view of a cap member.
Figure 11B:
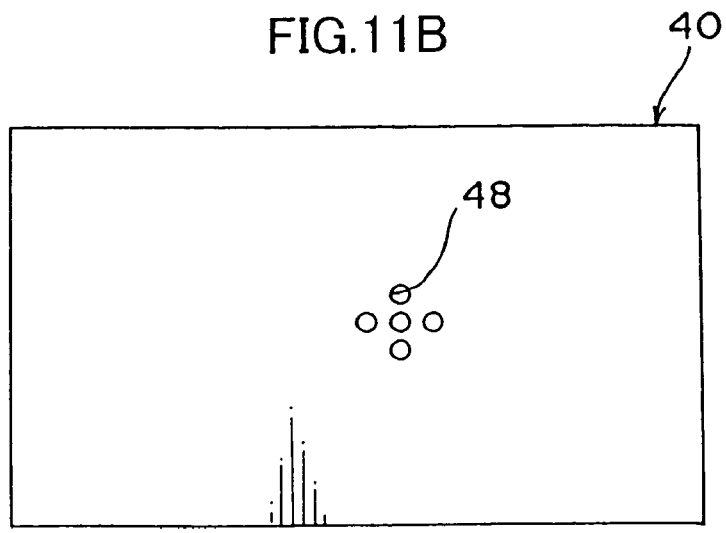
FIG. 11B is a plan view of a cap member according to further embodiment of the present invention.

In the present embodiment, as shown in FIG. 11A, one communicating hole 42 is formed at a central portion of the cap member 40. However, in accordance with the equation set out claim 1, as shown in FIG. 11B, a plurality of the communicating holes 48 with a small diameter can be formed at the central portion of the cap member 40.

A plurality of the communicating holes 48 with small diameters generates more resistance than that with a large diameter thus enhancing damping performance.

Fourth Embodiment

Next, with reference to FIG. 12, a rim wheel according to a fourth embodiment of the present invention will be explained. Portions identical to those in the previous embodiments will be denoted by the same reference numerals, and a description thereof will be omitted.

The rim wheel 10 according to the present embodiment is used to structure a so-called run flat tire, and is provided with a ring-shaped core 56 disposed in the tire.

Since the core 56 is responsible for supporting a load when an inner pressure of the tire is lowered (during a puncture of the tire), the sub-air chambers 32 and the cap members 40 are respectively divided at both sides in a tire axial direction of the core 56, and the application of a load on the cap members 40 can thus be prevented.

Fifth Embodiment

Next, with reference to FIG. 13, a rim wheel according to a fifth embodiment of the present invention will be explained.

Portions identical to those in the previous embodiments will be denoted by the same reference numerals, and a description thereof will be omitted.

Figure 13:
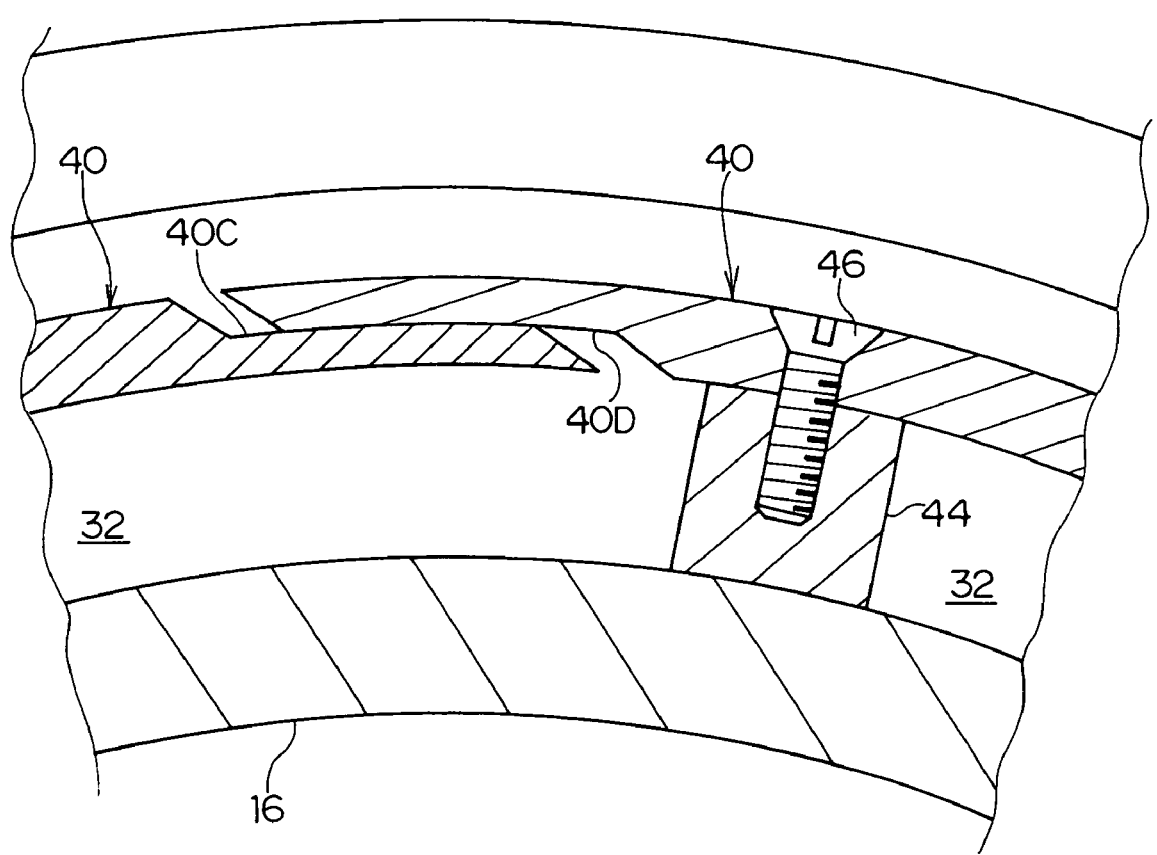
FIG. 13 is a cross-sectional view of a portion at which cap members are connected to each other, of a rim wheel according to a fifth embodiment of the present invention.
Figure 14:
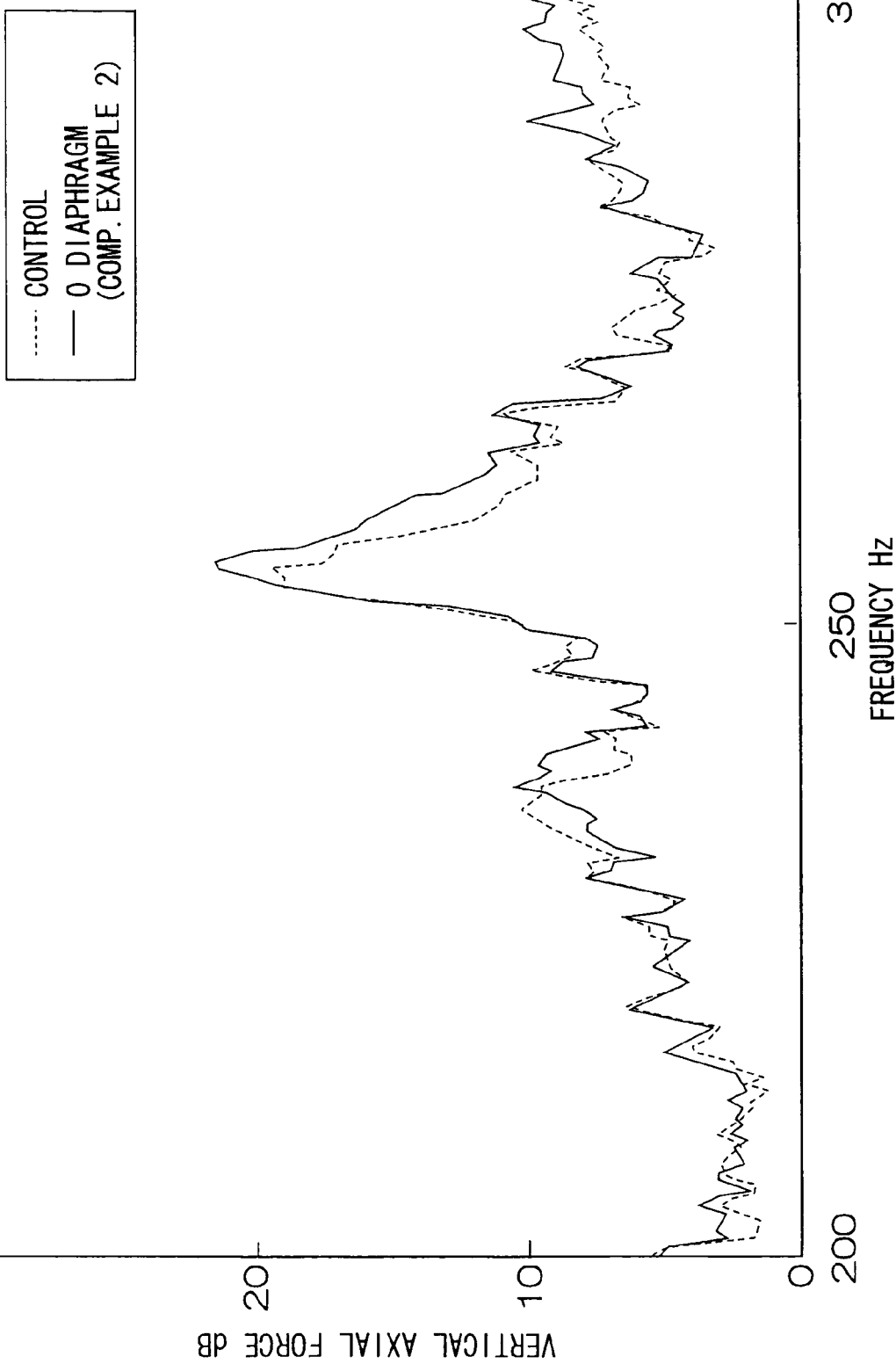
FIG. 14 is a graph illustrating frequency analysis results of vertical axial forces in Control and Comparative Example 2.
Figure 15:
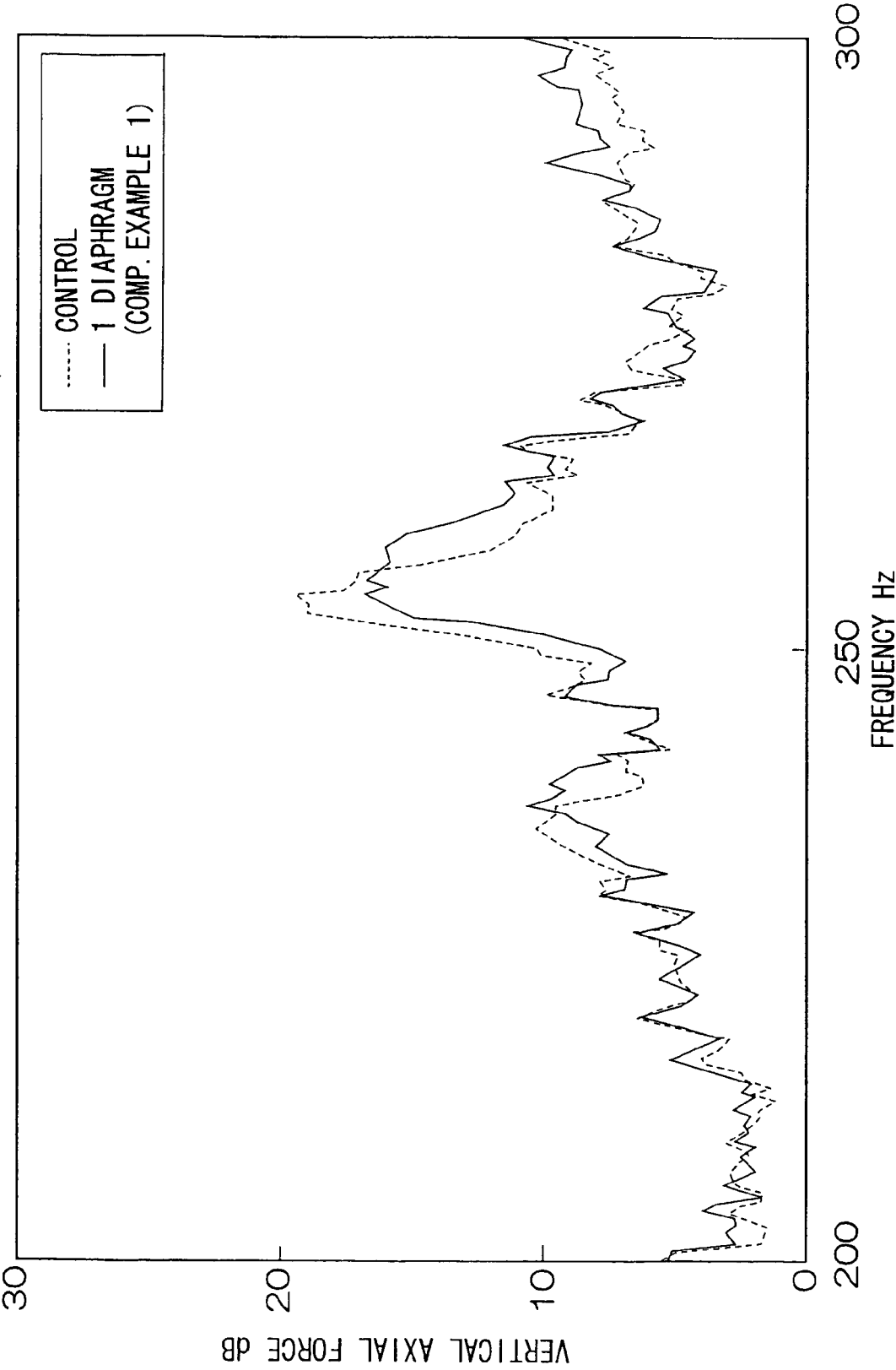
FIG. 15 is a graph illustrating frequency analysis results of vertical axial forces in Control and Comparative Example 1.
Figure 16:
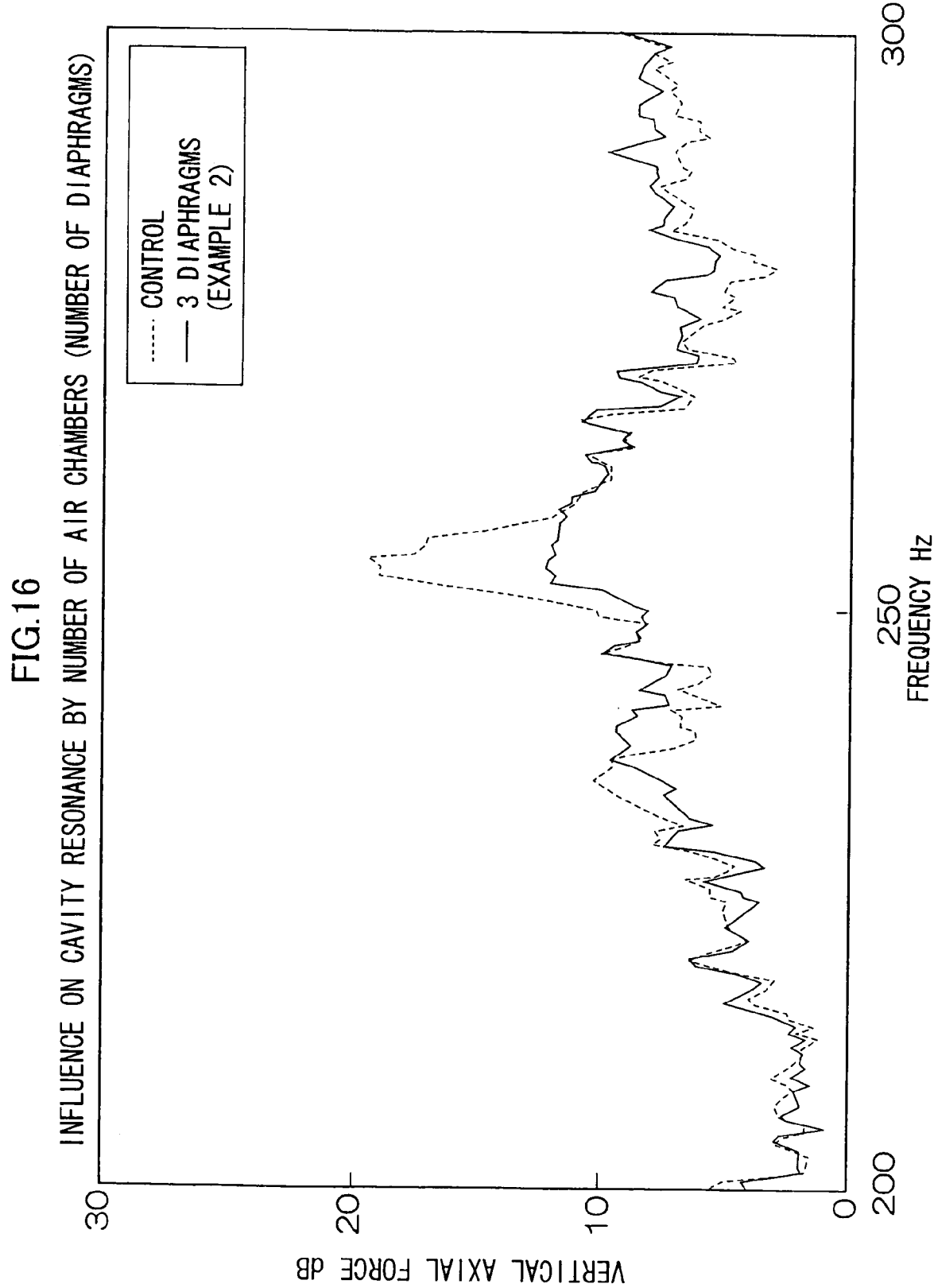
FIG. 16 is a graph illustrating frequency analysis results of vertical axial forces in Control and Example 2.
Figure 17:
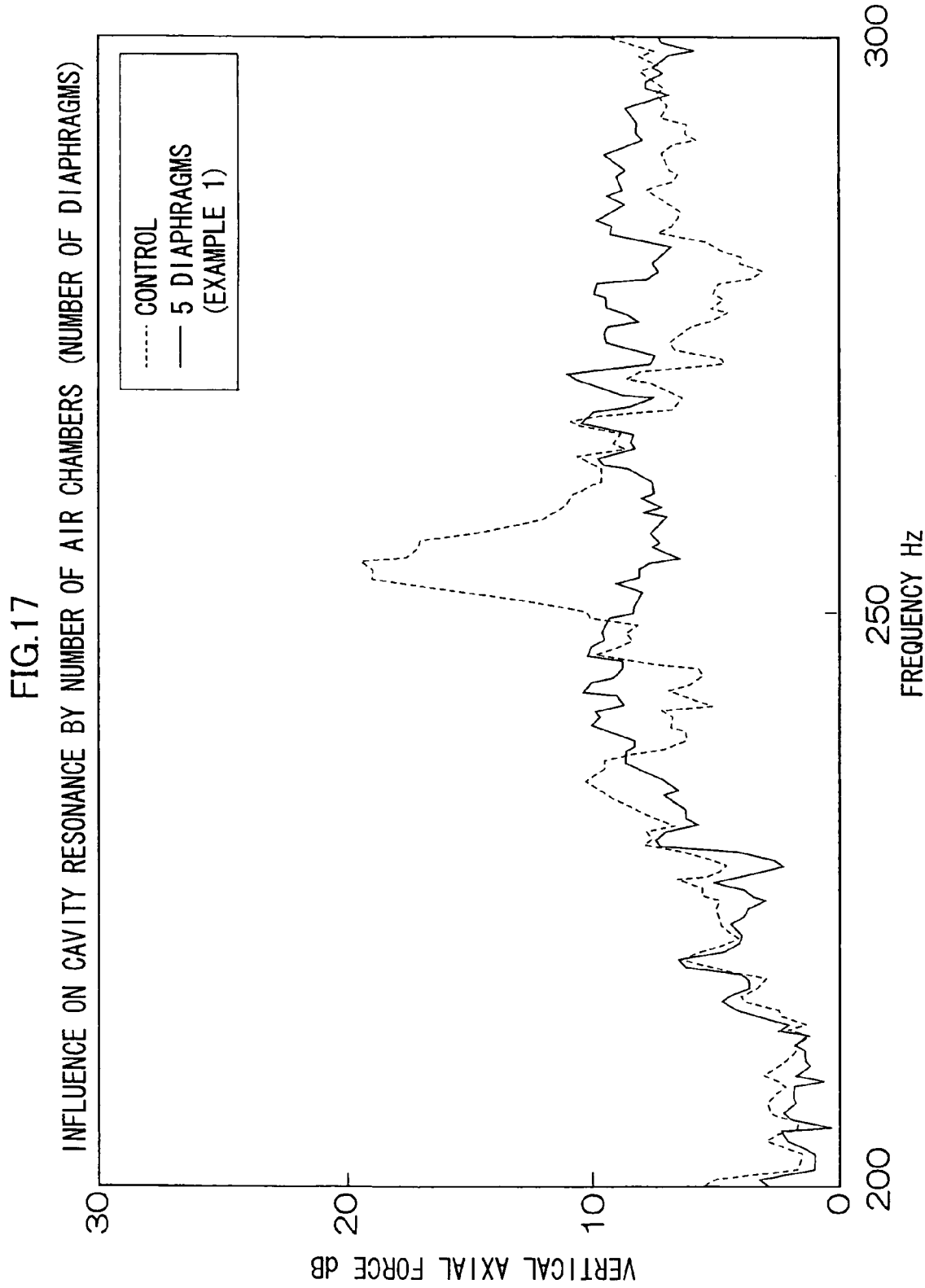
FIG. 17 is a graph illustrating frequency analysis results of vertical axial forces in Control and Example 1.

As shown in FIG. 13, a first step portion 40C, which is in parallel to an outer circumferential surface of the cap member 40, positioned inwardly in a rim radial direction of the outer circumferential surface and faces outwardly in the rim radial direction, is formed at one end edge side of the cap member 40 in the rim circumferential direction. On the other hand, a second step portion 40D, which is in parallel to an inner circumferential surface of the cap member 40, positioned outwardly in a rim radial direction of the inner circumferential surface and faces inwardly in the rim radial direction is formed at the other end edge side of the cap member 40 in the rim circumferential direction.

In the present embodiment, a pair of the cap members 40 adjacent to each other is sealed by portions of the first step portion 40C and the second step portion 40D tightly contacting with each other in a rim widthwise direction.

Since the second step portion 40D facing inwardly in the rim radial direction covers over the first step portion 40C facing outwardly in the rim radial direction, when the cap members 40 are attached to the rim 16 with screws or the like, sealability therebetween improves.

Further, since portions of the first step portion 40C and the second step portion 40D are kept in close contact with each other in the rim widthwise direction, even in the case of errors in measurement occurring in the circumferential direction of the cap members 40, sealability between the cap members 40 can be maintained.

(Experimental Demonstrations 1)

In order to verify the effects of the present invention, a Control product (a combination product of a conventional rim wheel and a tire), a combination product of a rim wheel to which the present invention was applied and a tire (Example), and a comparative product in which the number of diaphragms, i.e., the number of sub-air chambers, was changed, were experimentally manufactured to conduct a road noise evaluation drum test.

Control product: an ordinary 195/55R15 size-vehicle tire was attached to an ordinary 6JJ15-aluminum wheel.

Example 1: a vehicle tire which was the same as the Control product was attached to a rim wheel (having five diaphragms) which was structured in the same manner as in FIG. 1.

As opposed to about 22000 cm$^3$ of a tire main air chamber, a total volume of sub-air chambers was 1500 cm$^3$ (6.8% of the tire main air chamber), and a diameter of a communicating hole was 0.8 cm, and a length of the communicating hole was 0.2 cm.

Example 2: the number of the diaphragms in Example 1 was changed to three. One communicating hole/air chamber was formed and had a diameter of 1.2 cm.

Comparative Example 1: the number of the diaphragms in Example 1 was changed to one, and communicating holes were arranged in the same way as in Example 1. (Namely, five communicating holes/air chamber were arranged with an equal distance therebetween in a rim circumferential direction.)

Comparative Example 2: all of the diaphragms in Example 1 were removed and the product had continuous sub-air chambers in a rim circumferential direction. Communicating holes were positioned in the same manner as in Example 1.

Comparative Example 3: the number of the diaphragms in Example 1 was changed to two. One communicating hole/air chamber was formed and had a diameter of 1.7 cm.

In accordance with the aforementioned equation, a resonance frequency for each of Examples and Comparative Examples was set to about 250 Hz.

A road noise drum had a diameter of 3 m, and attached thereto was asphalt similar to an ordinary road structure.

Subjected to a load of 400 kgf, a tire was pressed to a drum. While a vehicle was traveling at a speed of 60 km/h, and axial forces applied on the drum in various directions were measured to conduct frequency analysis.

This test was a method of testing the "road noise" conveyed, in the form of vibration, to the inside of a vehicle.

The results of frequency analysis of a vertical axial force are shown in FIGS. 14 to 17.

In the Examples, the cavity resonance peak is significantly lowered. On the other hand, in Comparative Example 1 in which diaphragms were not used, the results were somewhat worse than the Control. In Comparative Example 2, the results showed an improvement over the Control but could still not be considered adequate.

Figure 18:
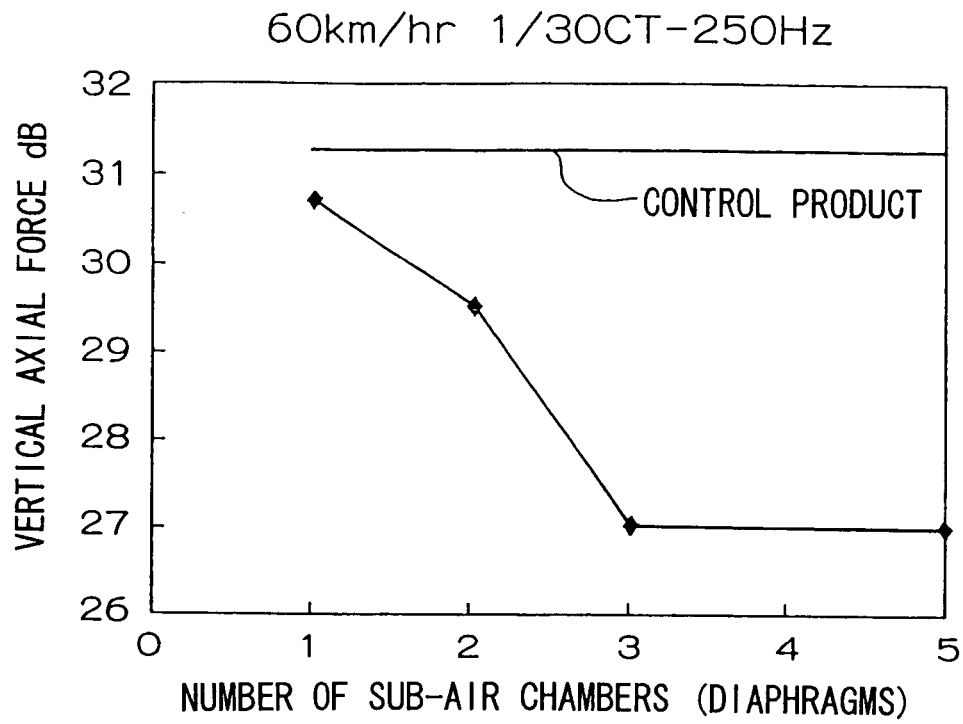
FIG. 18 is a graph illustrating a relationship between the number of sub-air chambers and the vertical axial force.
Figure 19:
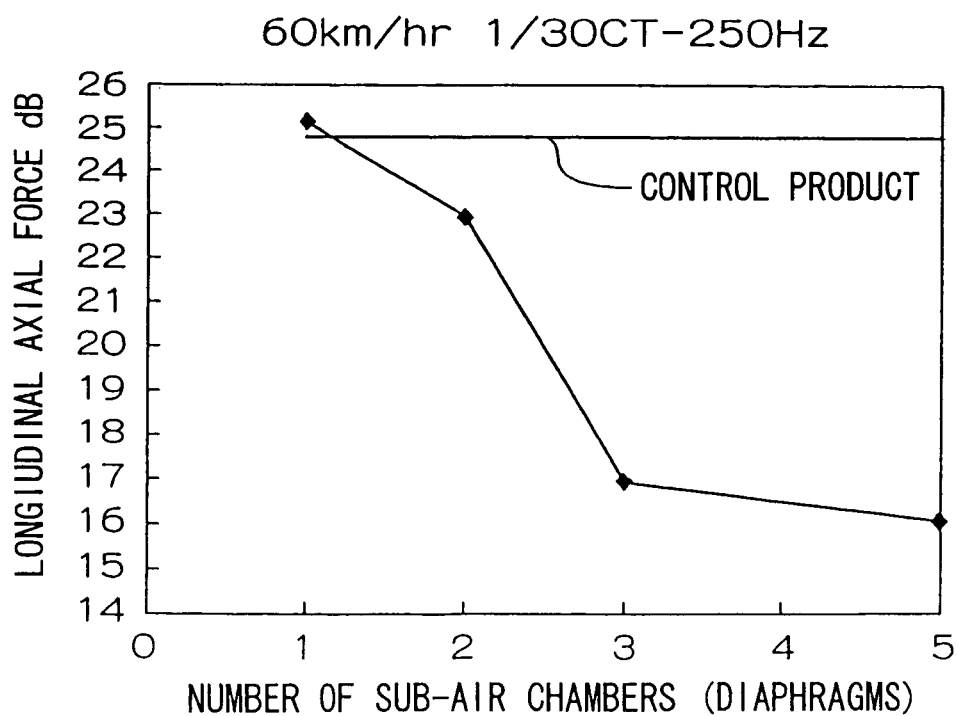
FIG. 19 is a graph illustrating a relationship between the number of the sub-air chambers and the longitudinal axial force.
Figure 20:
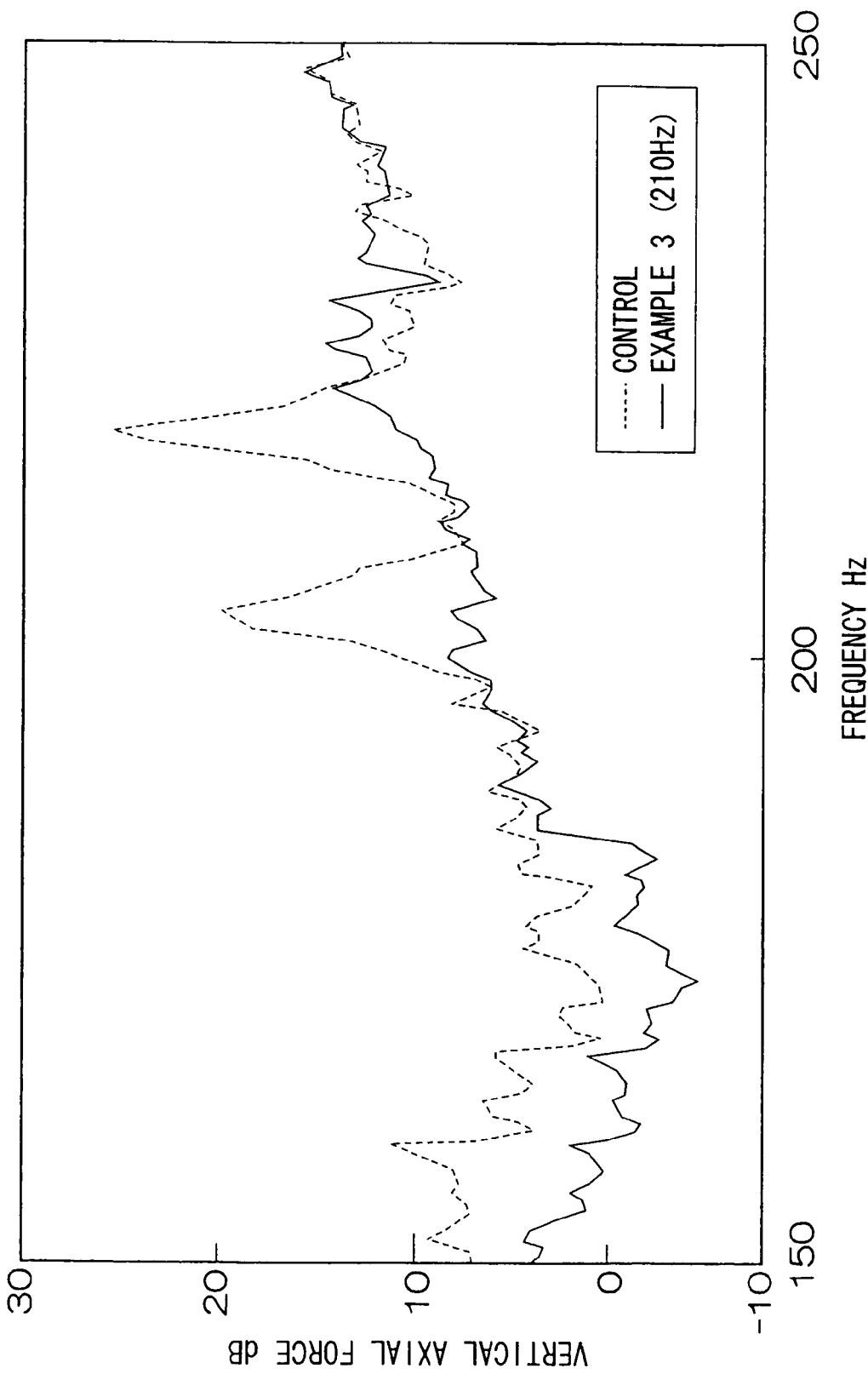
FIG. 20 is a graph illustrating frequency analysis results of vertical axial forces in Control and Example 3.
Figure 21:
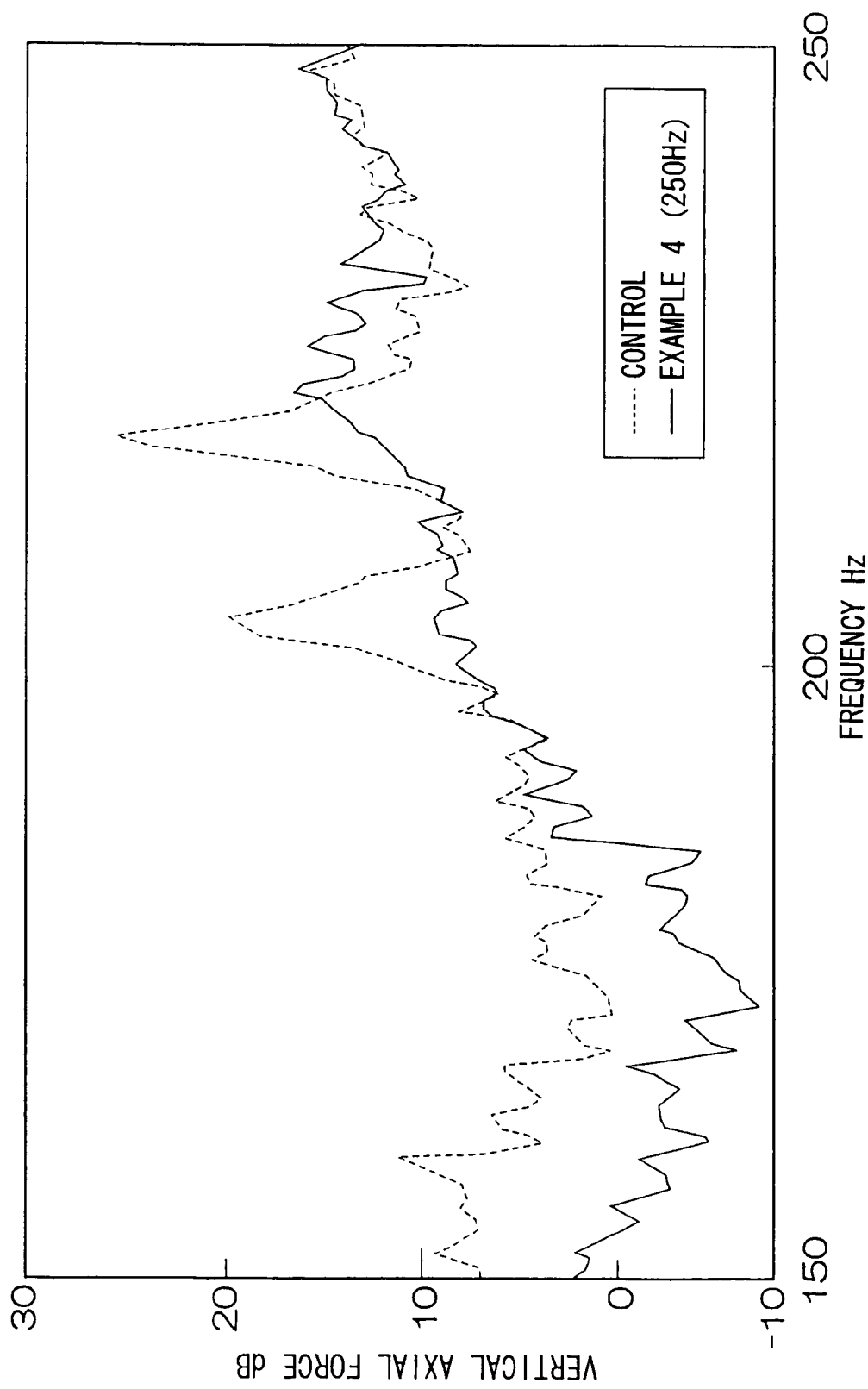
FIG. 21 is a graph illustrating frequency analysis results of vertical axial forces in Control and Example 4.
Figure 22:
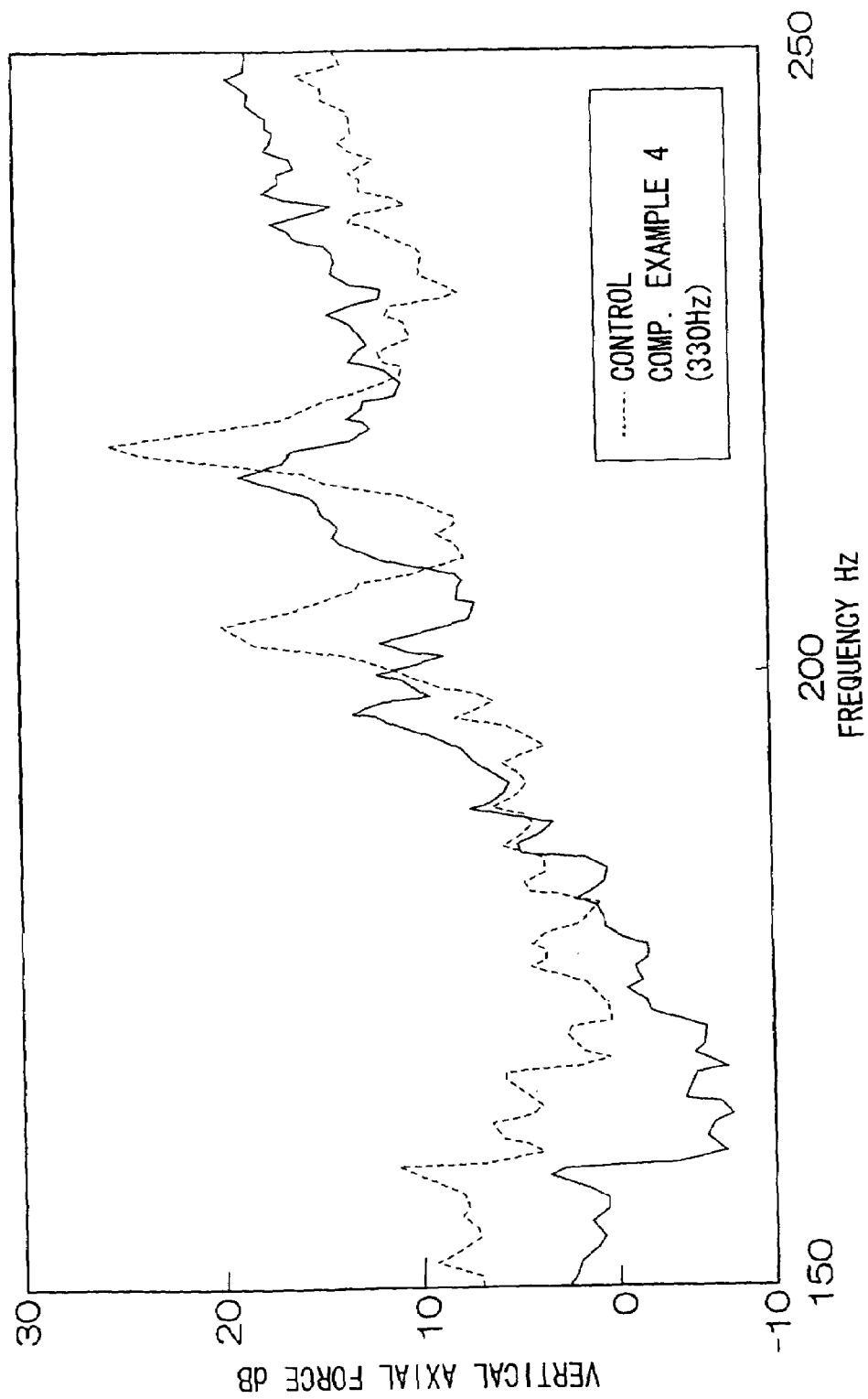
FIG. 22 is a graph illustrating frequency analysis results of vertical axial forces in Control and Comparative Example 3.
Figure 23:
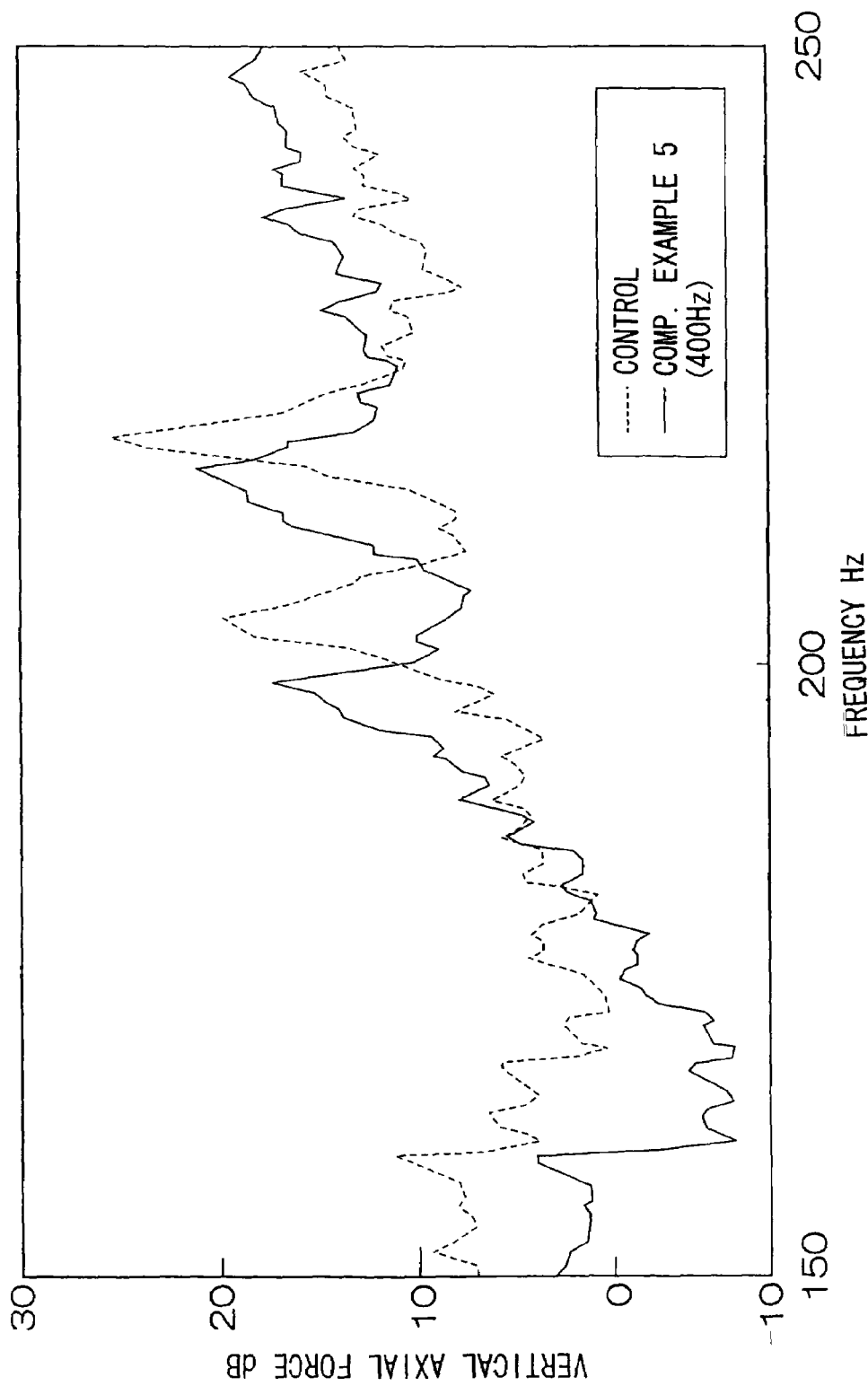
FIG. 23 is a graph illustrating frequency analysis results of vertical axial forces in Control and Comparative Example 4.

Further, FIG. 18 shows measurement results of a vertical axial force (1/3OCT-250 Hz), and FIG. 19 shows measurement results of a longitudinal axial force (1/3OCT-250 Hz).

The test results revealed that the greater the number of sub-air chambers, the more pronounced the reduction in cavity resonance was. In other words, if the number of sub-air chambers was three or more, reduction in cavity resonance could be enhanced significantly.

(Experimental Demonstrations 2)

In order to verify the effect of the present invention, the same product as that of Example 1 was attached to a car. On a test course, the car was actually driven by two test drivers and steering stability test and an effect of vibration on riding comfort test were conducted.

With regard to steering stability, driving performance, braking performance, driving wheel reaction performance, and controllability while the car was being driven were all comprehensively assessed. As for the effects of vibration on riding comfort test, a vibration test was conducted while a vehicle was travelling on a good road, another vibration test while a vehicle was travelling on a bad road, another vibration test while a vehicle was travelling on a special road such as road with different levels. In all cases, noise inside the vehicle were comprehensively evaluated, and expressed by indices on the basis of the control being 100. The larger the value of an index, the better the results. The results are shown in Table 1, as set out below:

TABLE 1

|  | Control | Example 1 | Example 2 | Comparative Example 1 | Comparative Example 2 |
|---|---|---|---|---|---|
| Noise inside vehicle | 100 | 145 | 125 | 100 | 90 |
| Effect of vibration on riding comfort | 100 | 120 | 115 | 110 | 110 |
| Steering stability | 100 | 110 | 100 | 100 | 100 |

The above results reveal that the products in the Examples to which the present invention has been applied have steering stability at least equal to that of the Control, that noise inside the vehicle (cavity resonance) is significantly reduced, and that the adverse effects of vibration on riding comfort significantly diminished.

As for the effects of vibration on riding comfort, specifically, a reduction in sensation of shock was particularly observed.

On the other hand, as was in the drum test, when the number of air chambers (i.e., the number of diaphragms) was less than three, it was confirmed that improvements were modest.

(Experimental Demonstrations 3)

In order to confirm the effects of the present invention, a Control product (a combination product of a conventional rim wheel and a tire), a combination product of a rim wheel to which the present invention was applied and a tire (Example), and a comparative product in which the number of diaphragms was changed were experimentally manufactured in sizes different from those of Experimental Demonstrations 1, to conduct a road noise evaluation drum test.

Control product: a 225/55R17 size-ordinary vehicle tire was attached to a 7.5JJ17-ordinary aluminum wheel.

Example 3: a vehicle tire which was the same as the Control was attached to a rim wheel having the same structure as that in FIG. 1.

As opposed to about 35000 cm³ of a tire main air chamber, a total volume of sub-air chambers was 2000 cm³ (5.7% of the tire main air chamber). Four diaphragms were formed on a rim circumference separated from each other at equal distances. One communication hole with a diameter of 0.9 cm and a length of 0.2 cm was formed at a central portion of each sub-air chamber, and cavity resonance was set to about 210 Hz.

Example 4: a diameter of the communicating hole in Example 3 was changed to 1.2 cm, and a resonance frequency was set to about 250 Hz.

Comparative Example 4: the number of communicating holes in Example 3 was changed to two per one air chamber (holes arranged at a distance of 10 cm from each other at a central portion in a circumferential direction of each sub-air chamber). Each communicating hole had a diameter of 1.1 cm, and a resonance frequency was set to about 330 Hz.

Comparative Example 5: the number of communicating holes in Example 3 was changed to three per air chamber (holes arranged at distances of 3 cm from each other at a central portion in a circumferential direction of each sub-air chamber). Each communicating hole had a diameter of 1.05 cm, and a resonance frequency was set to about 400 Hz.

A tire rim assembly using the thus manufactured wheel according to the present invention, and a tire rim assembly using an ordinary control wheel, were respectively applied in a road noise drum test identical to that in Example 1.

Subjected to a load of 520 kgf, a tire was pressed to a drum. While a vehicle was travelling at a speed of 60 km/h, drum axial forces in various directions were measured, and a frequency analysis was conducted.

FIGS. 20 to 23 show the results of frequency analysis of vertical axial forces.

In Examples 3 and 4, a peak of cavity resonance was substantially lowered. On the other hand, in Comparative Examples 4 and 5, resonance frequency in accordance with the aforementioned computational equation was out of a predetermined range. Results thereof were better than those of the Control wheel, but a reduction in the peak of cavity resonance was inadequate.

(Experimental Demonstrations 4)

In order to confirm the effects of the present invention, the same rim wheel as that in Experimental Demonstrations 3 was attached to a car, and on a test course, the car was actually driven by two test drivers to conduct a steering stability test and a test for analyzing an effect of vibration on riding comfort.

The results were shown in Table 2.

TABLE 2

|  | Control | Example 3 | Example 4 | Comparative Example 4 | Comparative Example 5 |
|---|---|---|---|---|---|
| Noise inside vehicle | 100 | 155 | 135 | 110 | 100 |
| Effect of vibration on riding comfort | 100 | 115 | 110 | 105 | 105 |
| Steering stability | 100 | 110 | 110 | 100 | 100 |

The results of these tests confirmed that products in the Examples to which the present invention had been applied had steering stability at least equal to that of the Control product, that noise inside the vehicle (cavity resonance) was significantly reduced and that the adverse effects of vibration on riding comfort significantly diminished.

With regard to the effects of vibration on riding comfort, a reduction in a sensation of shock was particularly observed.

On the other hand, as was the drum test, it was confirmed that improvements in Comparative Examples were modest.

(Experimental Demonstrations 5)

In order to confirm the effects of the present invention, the Control product in Experimental Demonstrations 3 and the tire rim assembly in Example 3 were used to measure noise inside a vehicle.

Figure 24:
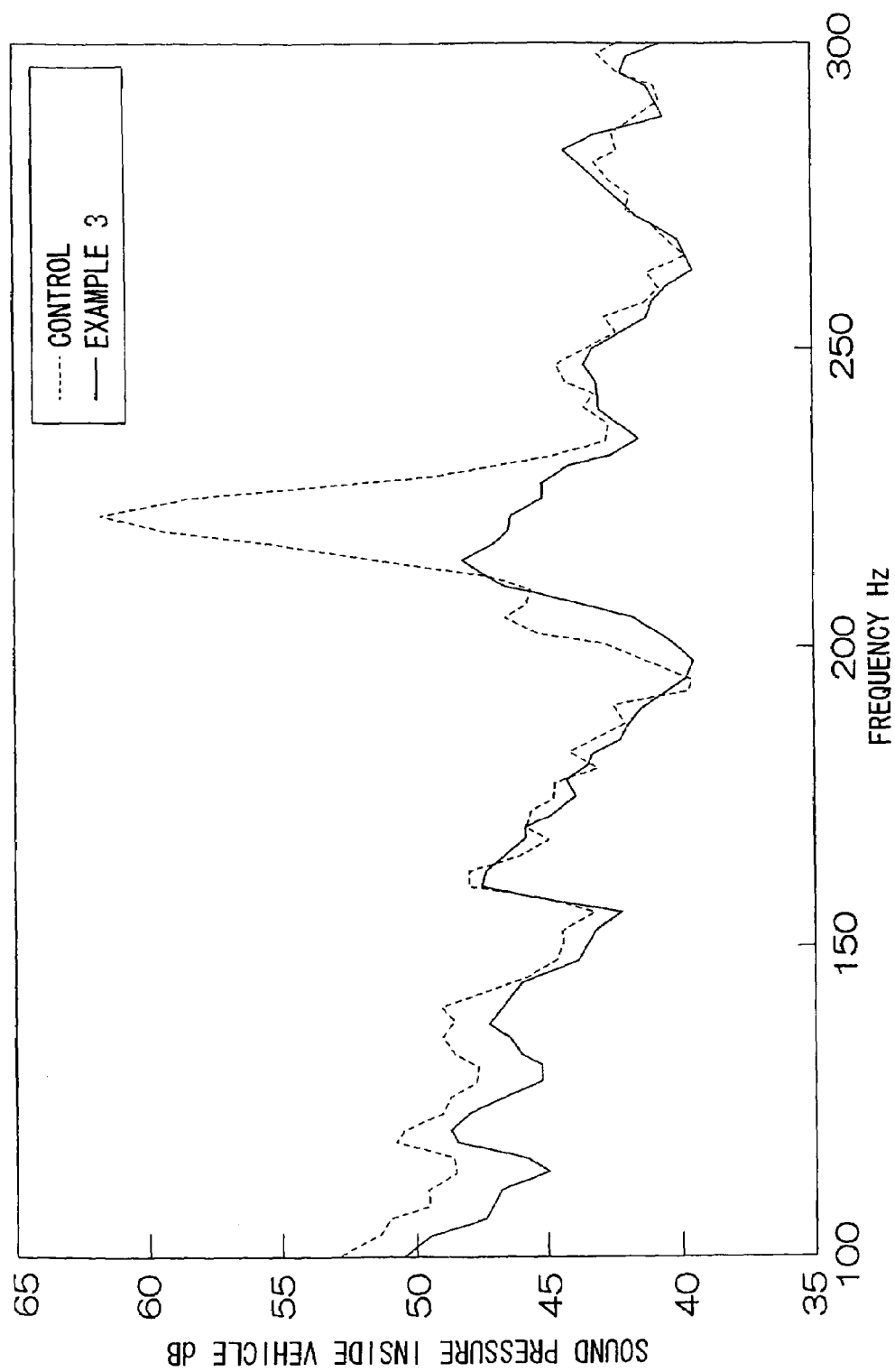
FIG. 24 is a graph illustrating measurement results of a noise inside the vehicle in Control and Example 3.

FIG. 24 shows the measurement results of noise inside the vehicle measured by using microphones set near the ears of the drivers. A road surface was formed by simulating a general urban road and had small irregularities such as portions under repair and road paint. The Control product and Example 3 were compared and it is noteworthy that the adverse effects of cavity resonance have been substantially reduced in Example 3.

(Experimental Demonstrations 6)

In order to confirm the effects of the present invention, a Control product (a combination product of a conventional rim wheel and a tire), a combination product of a rim wheel to which the present invention was applied and a tire (Example), and a comparative product in which a setting of a volume of sub-air chambers was changed, were manufactured to conduct a road noise evaluation drum test.

Control product: a 185/65R15 size-ordinary vehicle tire was attached to a 6JJ15-ordinary aluminum wheel.

Example 5: the same vehicle tire as the Control product was attached to a rim wheel having the same structure as that shown in FIG. 1. As opposed to about 24000 cm$^3$ of a tire main air chamber, a total volume of sub-air chambers was 1650 cm$^3$ (6.9% of the tire main air chamber). Five diaphragms were formed separated by equal distances on the rim circumference. One communication hole was used per air chamber, and each had a length of 0.2 cm and a diameter of 0.85 cm.

Example 6: a total volume of the sub-air chambers in Example 5 was changed to 700 cm$^3$ and a volume ratio of the sub air chambers to the tire main air chamber was 2.9%. One communication hole was used per air chamber and each had a length of 0.2 cm and a diameter of 0.45 cm.

Comparative Example 6: a total volume of the sub-air chambers in Example 5 was changed to 300 cm$^3$ and a volume ratio of the sub air chambers to the tire main air chamber was 1.2%. One communication hole for one air chamber had a length of 0.2 cm and a diameter of 0.25 cm.

In accordance with the aforementioned equation, a resonance frequency for each of Examples and Comparative Examples was set to about 250 Hz.

The tire rim assembly using the thus manufactured rim wheel of the present invention, and a tire rim assembly using an ordinary control wheel were respectively subjected to the same road noise drum test as was conducted in Experimental Demonstrations 1.

Subjected to a load of 400 kgf, a tire was pressed to a drum, and while a vehicle was travelling at a speed of 60 km/h, drum axial forces in various directions were measured and a frequency analysis conducted.

Figure 25:
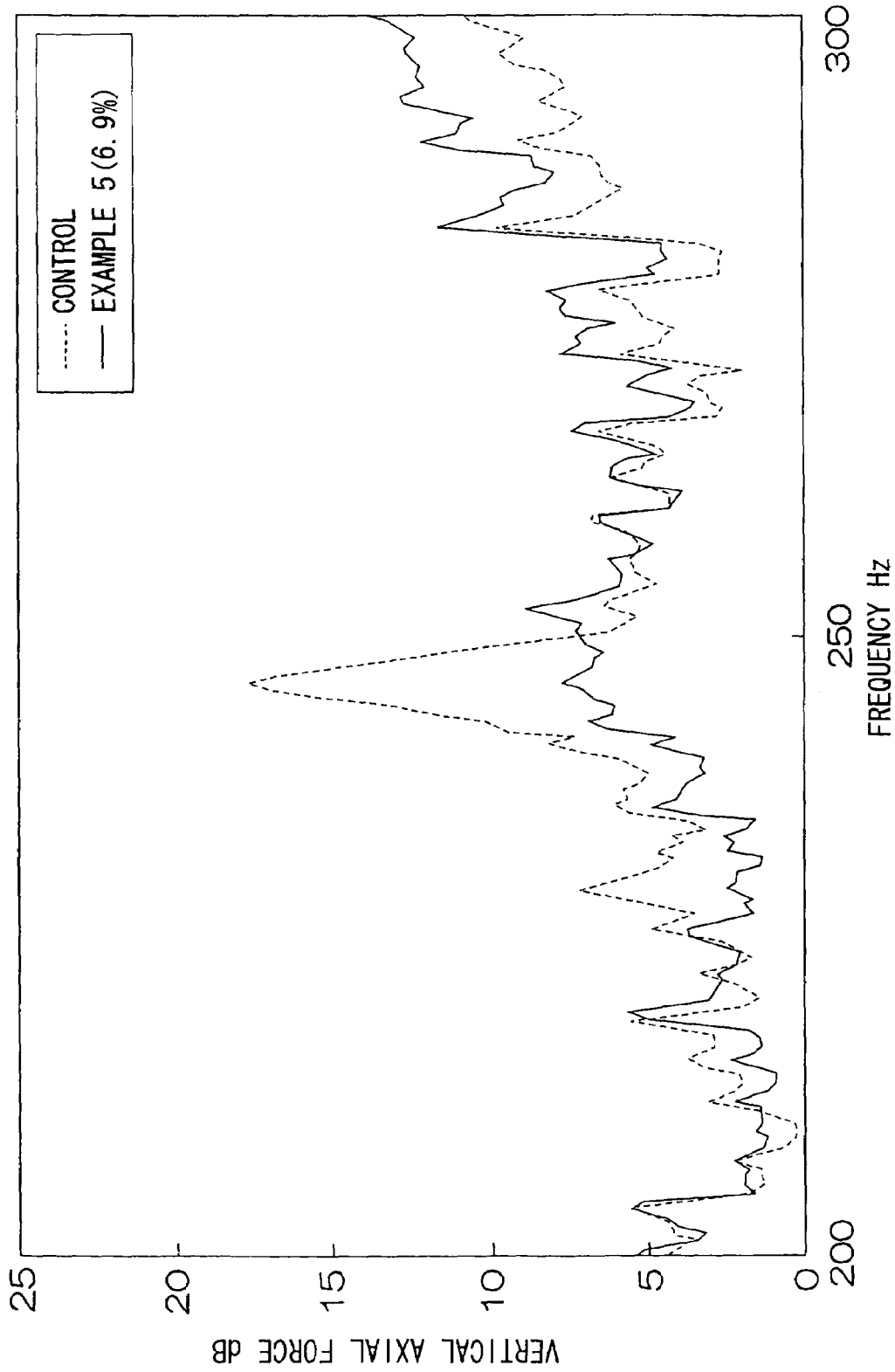
FIG. 25 is a graph illustrating frequency analysis results of vertical axial forces in Control and Example 5.
Figure 26:
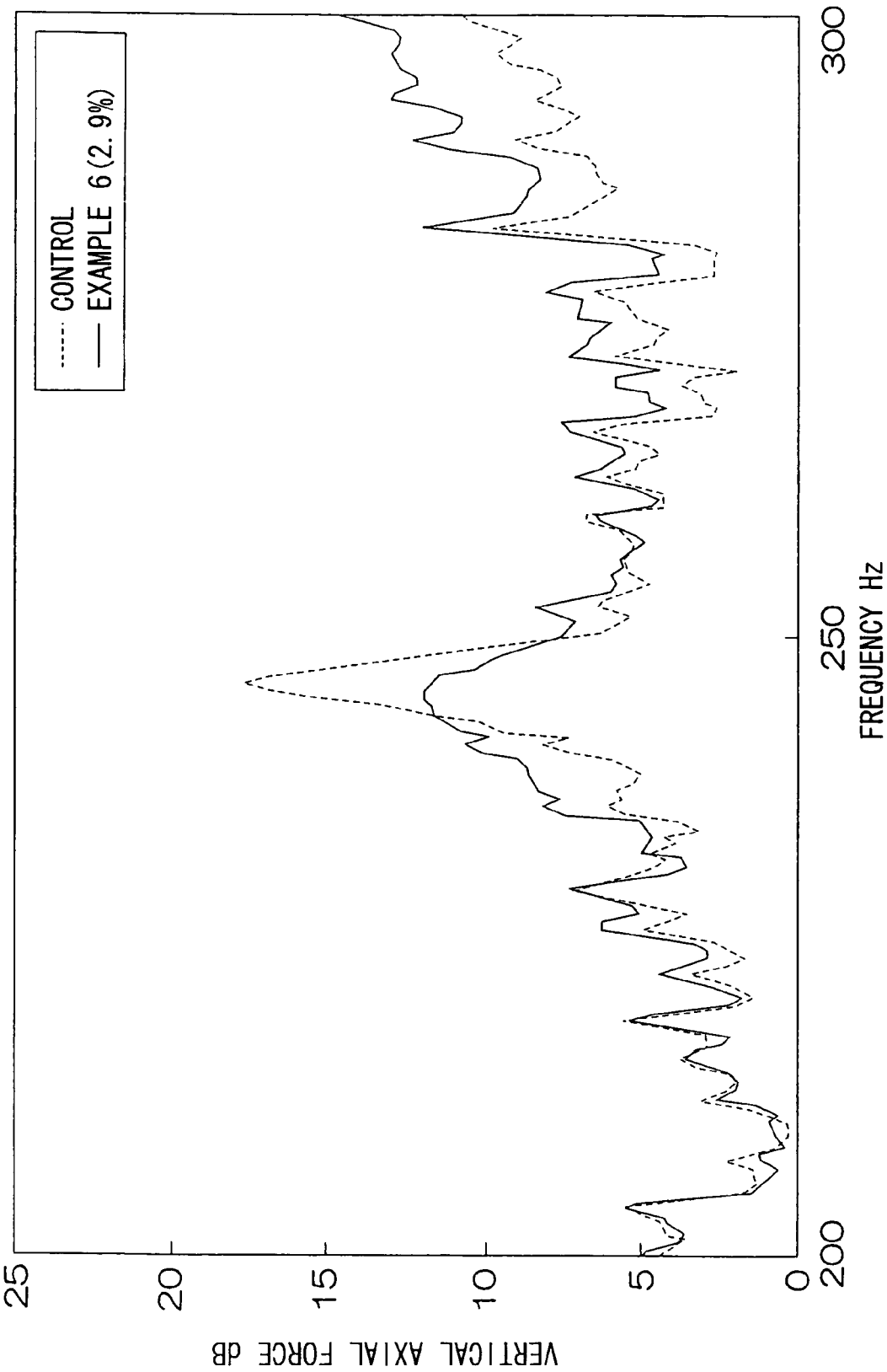
FIG. 26 is a graph illustrating frequency analysis results of vertical axial forces in Control and Example 6.
Figure 27:
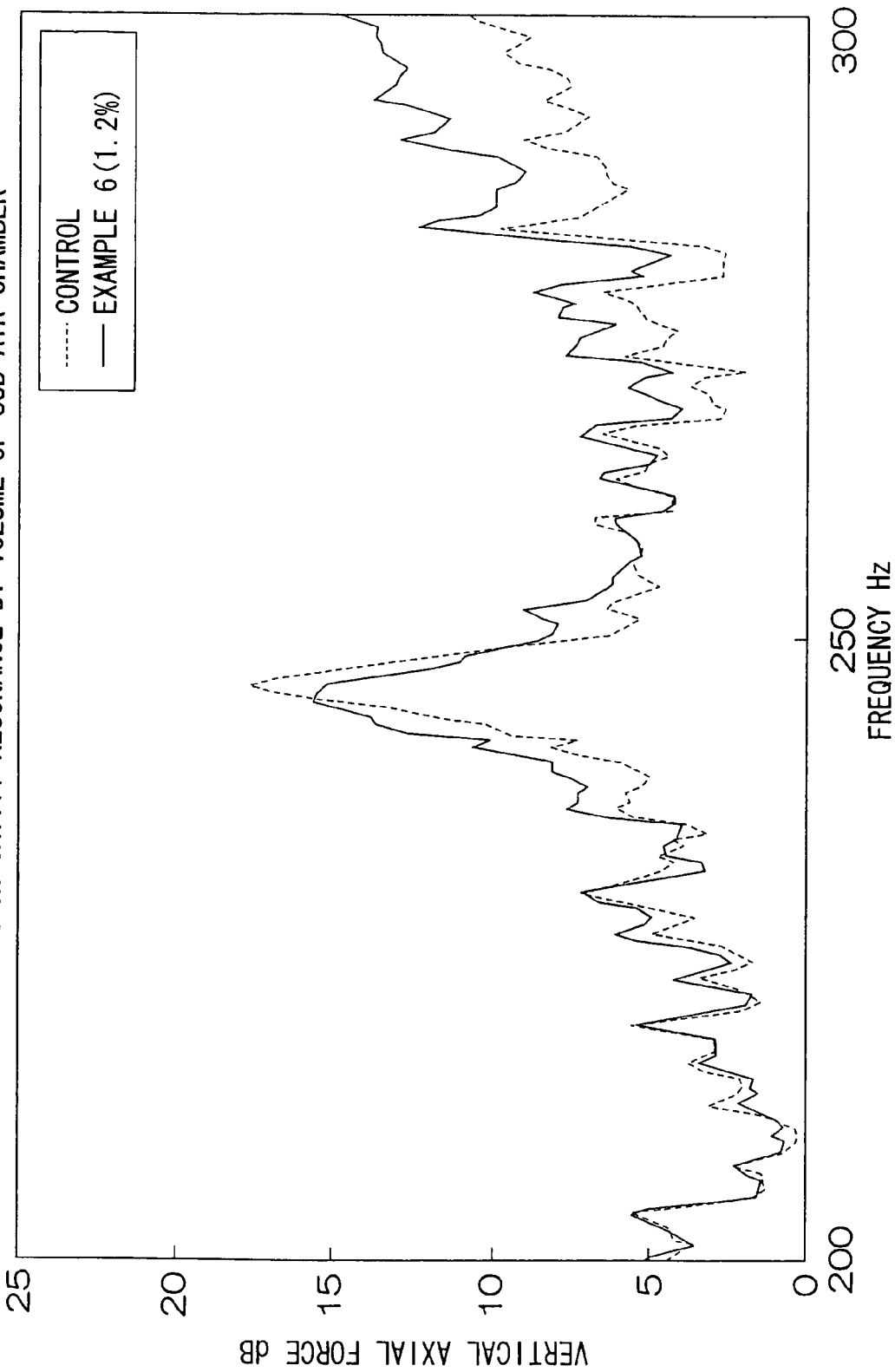
FIG. 27 is a graph illustrating frequency analysis results of vertical axial forces in Control and Comparative Example 5.

The results of frequency analysis of vertical axial forces are shown in FIGS. 25 to 27.

In Example 6, the peak of a cavity resonance was significantly lowered. On the other hand, the smaller the volume of sub-air chambers, the less pronounced was the lowering of the peak of cavity resonance. In Comparative Example 6, the results revealed more pronounced improvement than in the Control, but, the lowering of the peak could still not be considered adequate.

(Experimental Demonstrations 7)

In order to confirm the effects of the present invention, various types of rim wheels in which the numbers of sub-air chambers and communicating holes were different from each other were manufactured. Tires were attached to the respective thus manufactured rim wheels and road noise evaluation drum tests conducted.

Rim wheel: 6JJ15
Tire: 195/55R15

Tire rim assembly A (Control product): the rim wheel was equipped with cap members, and all of the communicating holes were blocked by the cap members (the sub-air chambers and a tire main air chamber were not made to communicate with each other). A volume of the tire main air chamber: 22000 cm$^3$.

Tire rim assembly B: five sub-air chambers were formed in a rim wheel. As opposed to a volume of about 22000 cm$^3$ of a tire main air chamber, a total volume of sub-air chambers was 1350 cm$^3$ (6.1% of the tire main air chamber). One communicating hole was formed at a center of each of the sub-air chambers. The diameter of a communicating hole was 1 cm, and the length thereof was 0.4 cm. Further, a resonance frequency was about 277 Hz.

Tire rim assembly C: one sub-air chamber was formed in a rim wheel. As opposed to about 22000 cm$^3$ of a volume of a tire main air chamber, a total volume of the sub-air chamber was 1350 cm$^3$ (6.1% of the tire main air chamber). Five communicating holes were formed at equal distances from each other in a circumferential direction of the sub-air chamber. The diameter of a communicating hole was 1 cm, the length 0.4 cm, and the resonance frequency was about 277 Hz.

Tire rim assembly D: one sub-air chamber was formed in a rim wheel. As opposed to about 22000 cm$^3$ volume of a tire main air chamber, a total volume of the sub-air chamber was 1350 cm$^3$ (6.1% of the tire main air chamber). Five communicating holes were formed at the center of the sub-air chamber. The diameter of a communicating hole was 1 cm, the length 0.4 cm, and the resonance frequency was about 277 Hz.

Tire rim assembly E: ten sub-air chambers were formed in a rim wheel. As opposed to 22000 cm$^3$ of a volume of a tire main air chamber, a total volume of the sub-air chambers was 1350 cm$^3$ (6.1% of the tire main air chamber). One communicating hole was formed at the central portion of each of the sub-air chambers. The diameter of the communicating hole was 0.6 cm, the length 0.4 cm, and the resonance frequency was about 275 Hz.

A drum (replica drum) had a diameter of 3 m. Asphalt, which resembled that of a general road configuration, was attached to the drum.

Subjected to a load of 400 kgf, a tire was pressed to the drum. While a vehicle was travelling at a speed of 60 km/h, drum axial forces in various directions were measured and a frequency analysis conducted.

Figure 28:
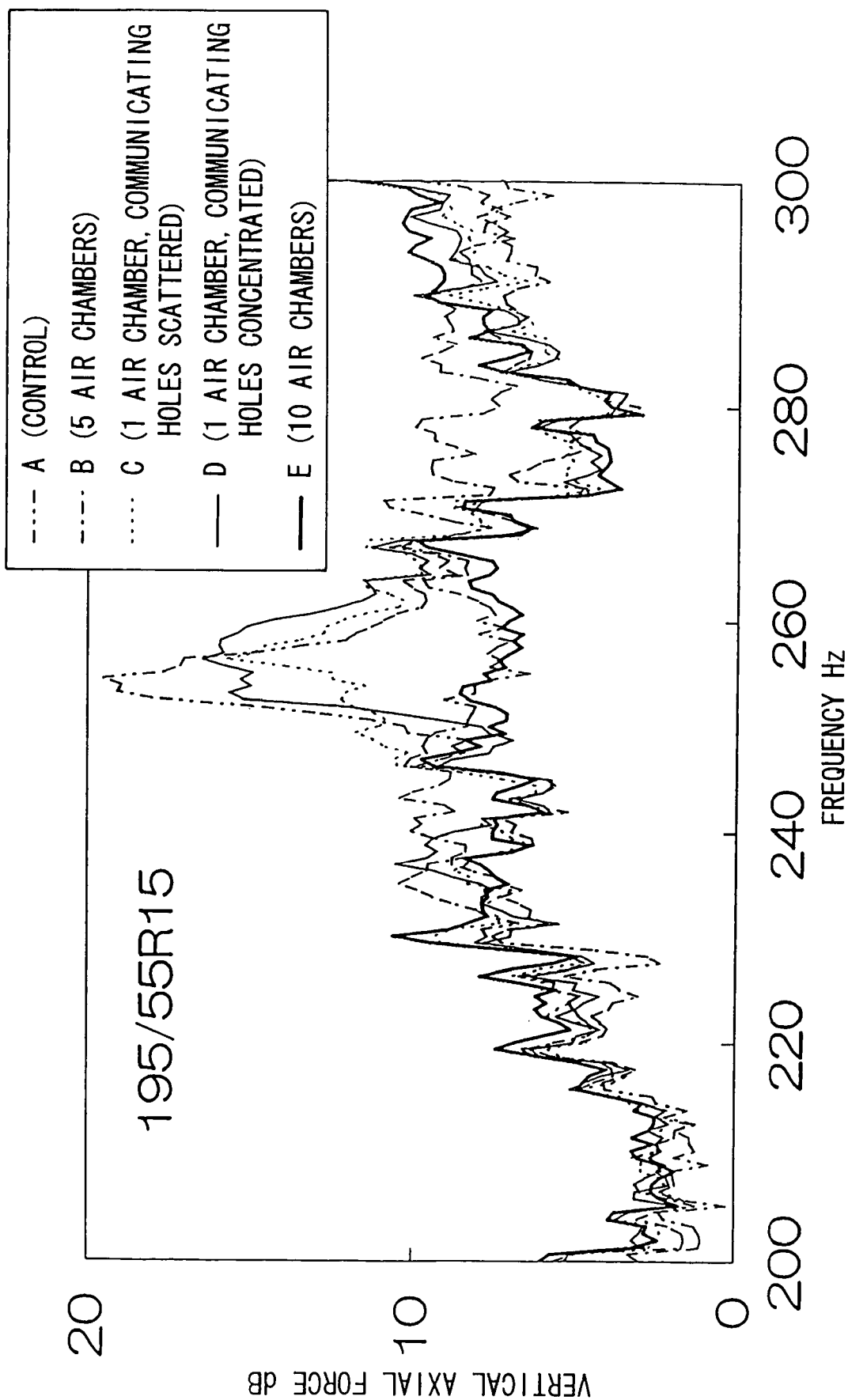
FIG. 28 is a graph illustrating frequency analysis results of vertical axial forces in Control and Examples A to E.
Figure 29:
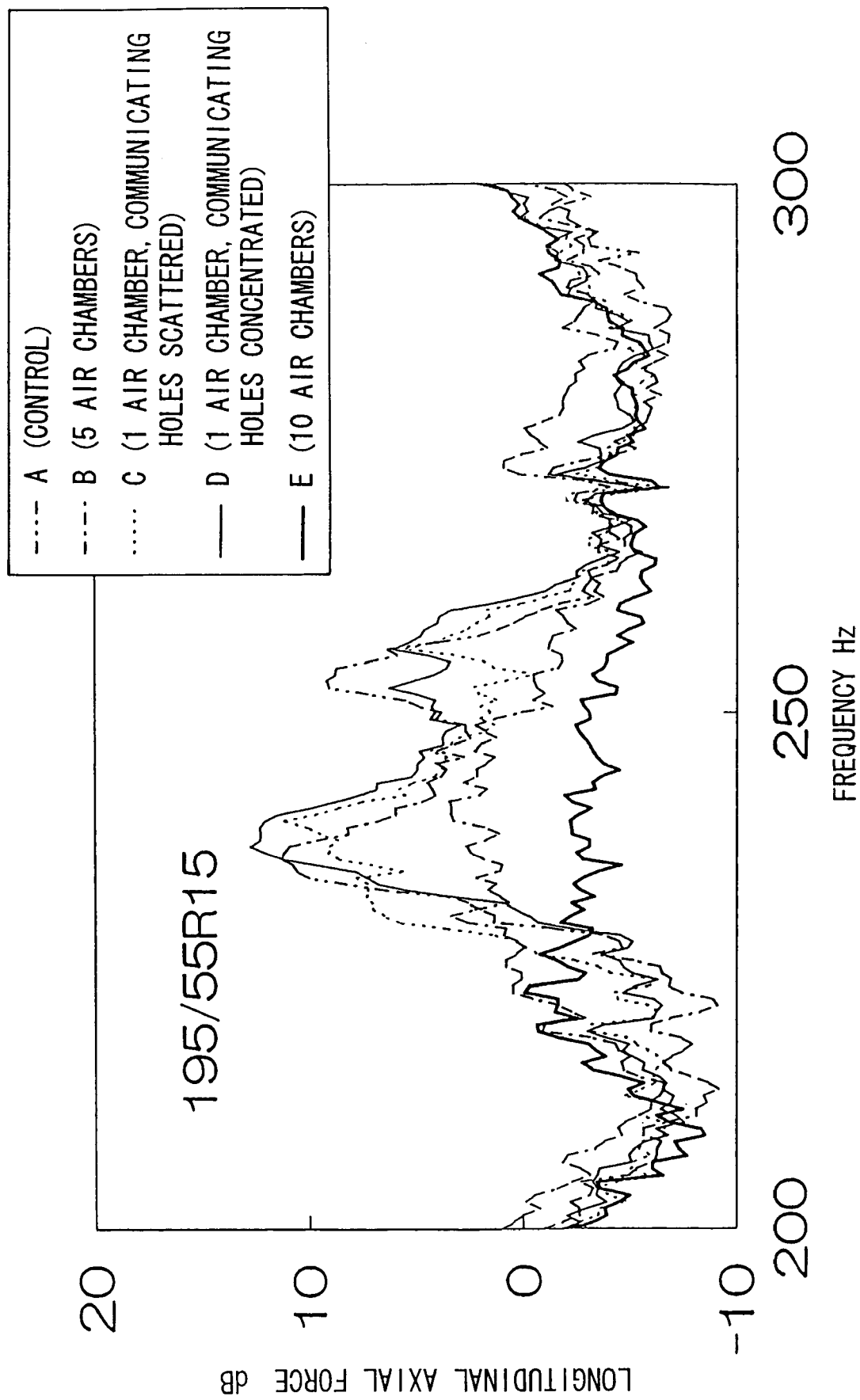
FIG. 29 is a graph illustrating frequency analysis results of longitudinal axial forces in Control and Examples A to E.
Figure 30:
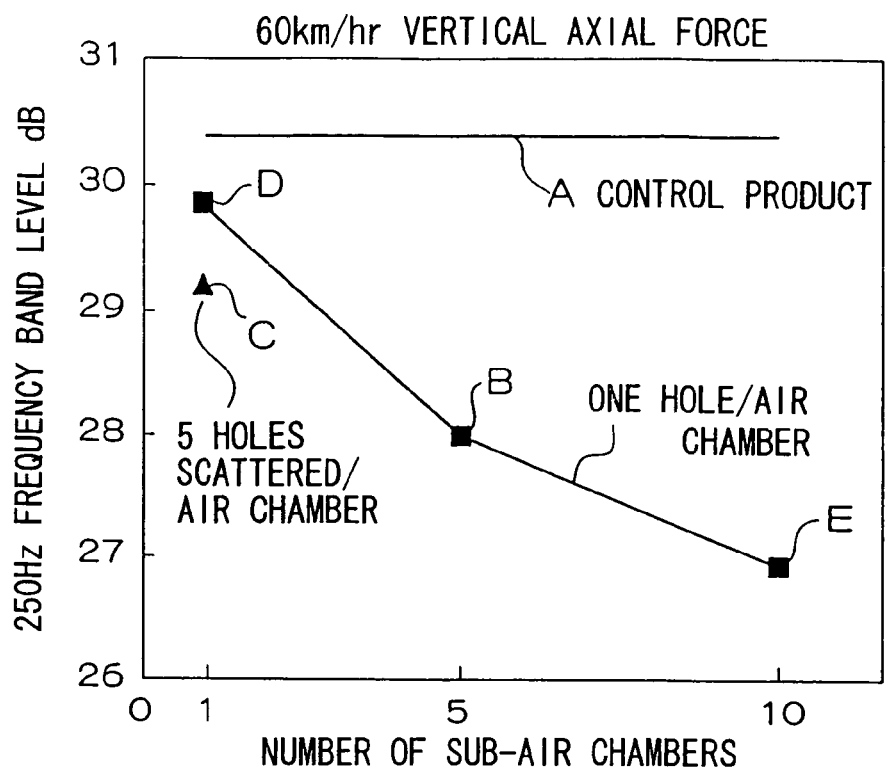
FIG. 30 is a graph illustrating a relationship between the number of sub-air chambers and communication holes, and a vertical axial force.
Figure 31:
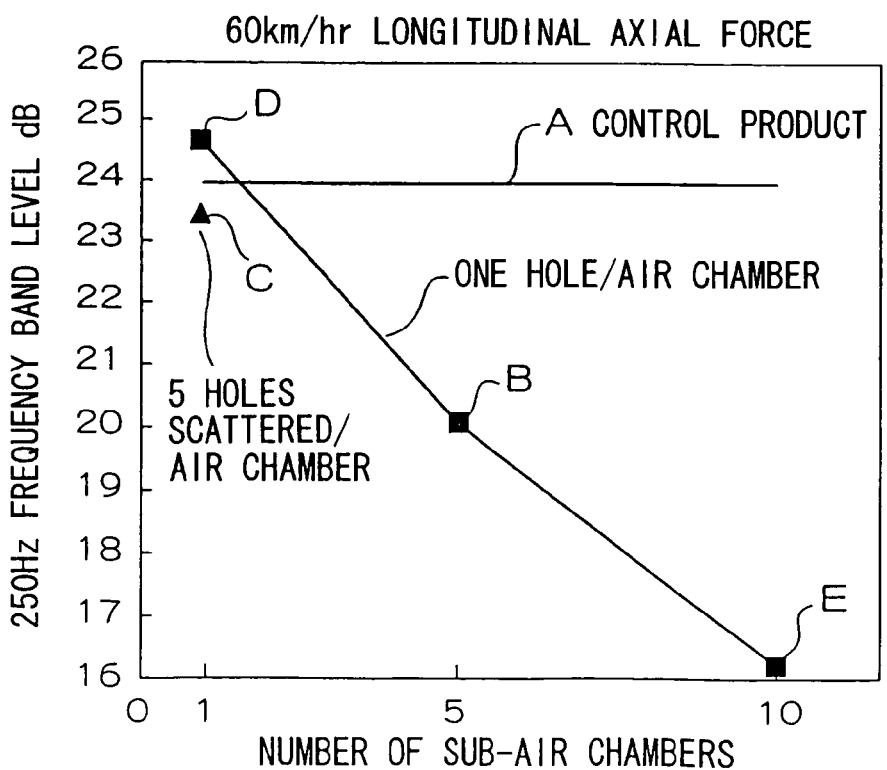
FIG. 31 is a graph illustrating a relationship between the number of the sub-air chambers and the communication holes, and a longitudinal axial force.

FIG. 28 shows the results of frequency analysis of a vertical axial force, FIG. 29 shows the results of frequency analysis of a longitudinal axial force, FIG. 30 shows a vertical axial force at a band level of 250 Hz, and FIG. 31 shows a longitudinal axial force at a band level of 250 Hz.

The results of the above test reveal that the greater the number of sub-air chambers formed, the more pronounced become the reduction in cavity resonance. Further, it was also observed that scattering the communicating holes in a circumferential direction of the sub-air chamber is more effective than concentrating those at the center of the sub-air chamber, so long as communicating holes are not formed too close to the diaphragms.

(Experimental Demonstrations 8)

In order to confirm the effects of the present invention, a combination product of a rim wheel to which the present invention was applied and a tire (Example), and Control product were manufactured to conduct a drum test.

Rim wheel: 6JJ15
Tire: 195/55R15

Tire rim assembly A: five sub-air chambers were formed in the rim wheel. As opposed to a volume of about 22000 cm$^3$ of a tire main air chamber, a total volume of the sub-air chambers was 1350 cm$^3$ (6.1% of the tire main air chamber). One communicating hole was formed at each of the sub-air chambers, and each hole had a diameter of 0.8 cm and a length of 0.3 cm.

Tire rim assembly B: five sub-air chambers were formed in the rim wheel. As opposed to a volume of about 22000 cm$^3$ of a tire main air chamber, a total volume of the sub-air chambers was 1350 cm$^3$ (6.1% of the tire main air chamber).

Four communicating holes were formed at each of the sub-air chambers, and each of the communicating holes had a diameter of 0.3 cm and a length of 0.3 cm.

Further, a resonance frequency set both for the rim assembly A and the rim assembly B was about 250 Hz.

The Control product that was structured in the same manner as those of the rim assembly A and the rim assembly B. However, the communications holes were entirely closed.

A drum had a diameter of 3 m, an entire surface of the drum was flat, and protrusions of a height of 10 mm were attached to a portion of the drum.

Subjected to a load of 400 kgf, a tire was pressed to a drum, and vertical axial forces and longitudinal axial forces were measured as a vehicle was travelling at speeds of 40, 60, and 80 km/h.

Figure 32:
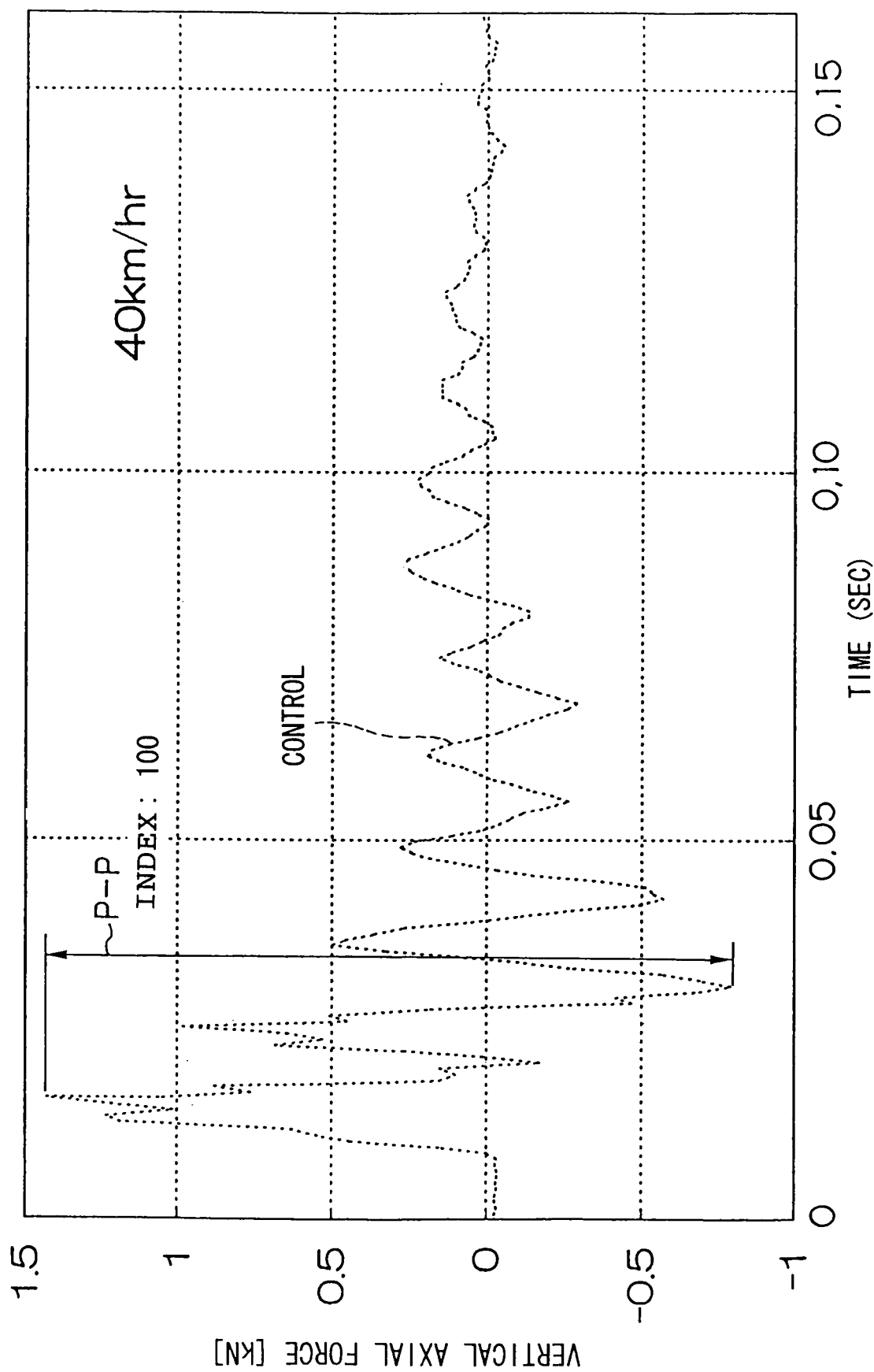
FIG. 32 is a graph illustrating a change in a vertical axial force at the time when Control product passes over protrusions.
Figure 33:
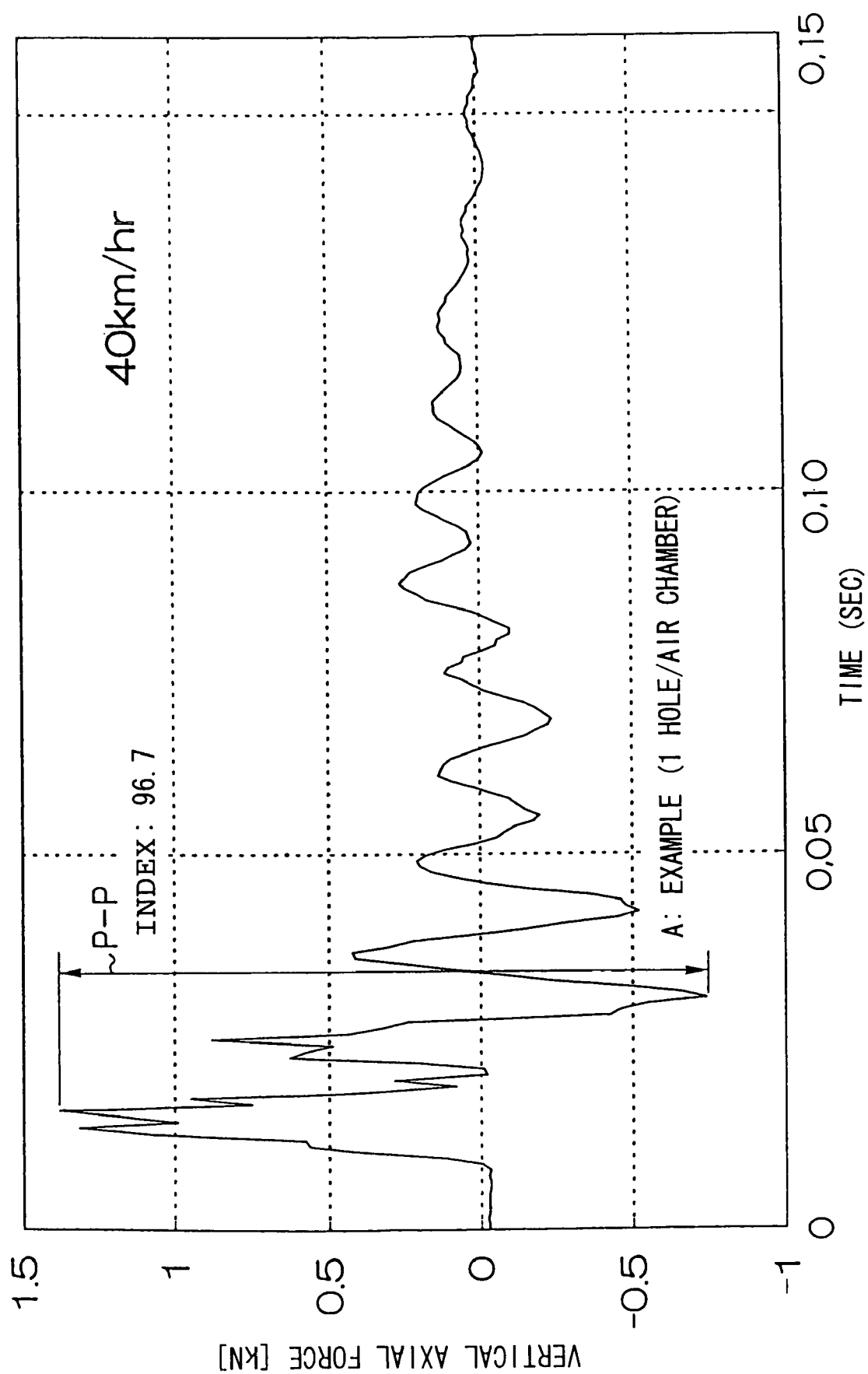
FIG. 33 is a graph illustrating a change in a vertical axial force at the time when Example product (1 hole/air chamber) passes over protrusions.
Figure 34:
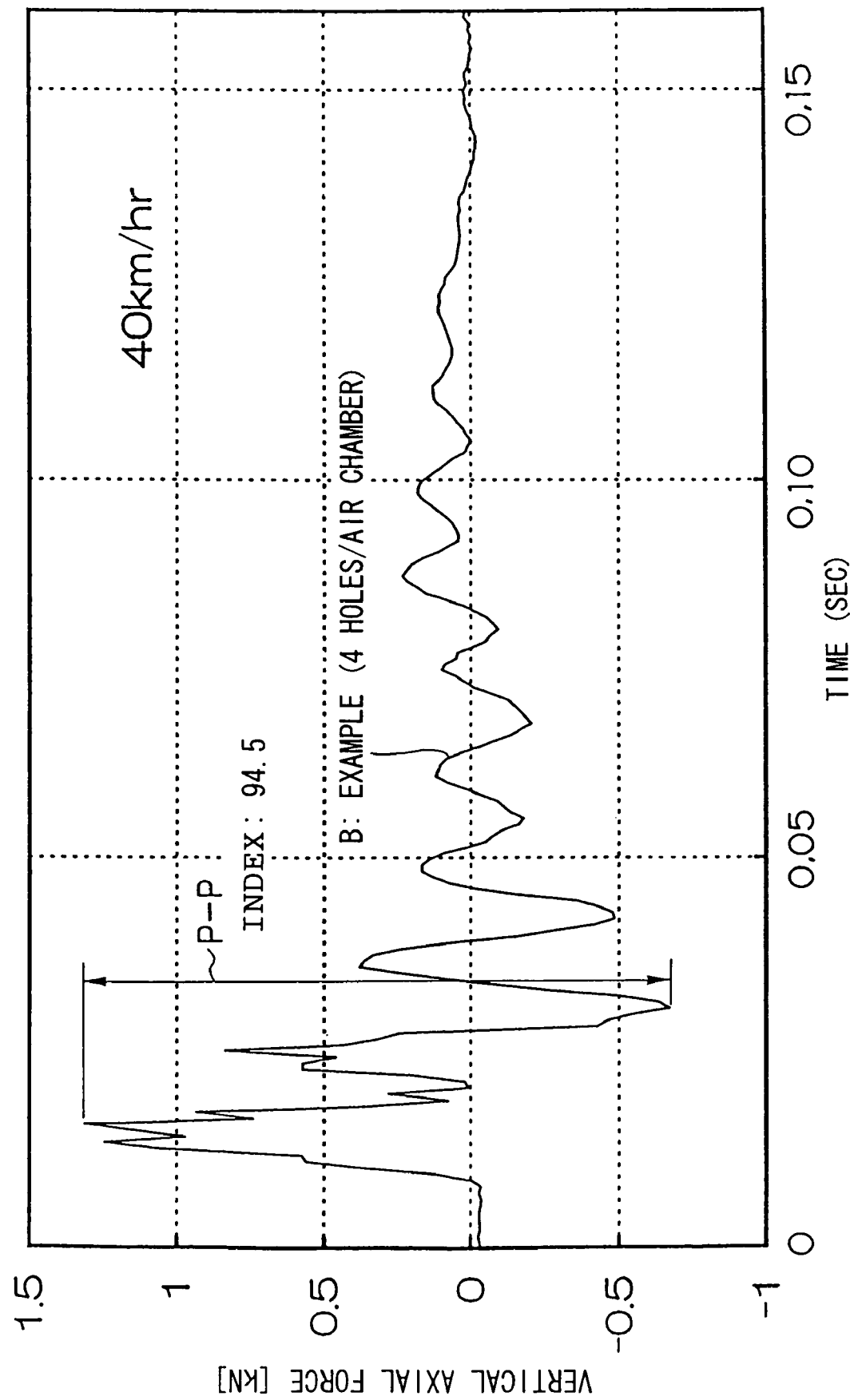
FIG. 34 is a graph illustrating a change in a vertical axial force at the time when Example product (4 holes/air chamber) passes over protrusions.

FIG. 32 is a graph illustrating the measurement results of the Control product. FIG. 33 is a graph illustrating the measurement results of the tire rim assembly A. FIG. 34 is a graph illustrating the measurement results of the tire rim assembly B. In the respective figures, a vehicle travelling speed was 40 km/h.

Set out in the following tables 3 and 4 are P-P indices obtained from the respective measurement results.

TABLE 3

| P-P index | Control | vertical axial force | |
|---|---|---|---|
| | | tire rim assembly A | tire rim assembly B |
| 40 km/h | 100 | 96.7 | 94.5 |
| 60 km/h | 100 | 96.8 | 96.7 |
| 80 km/h | 100 | 98.3 | 95.1 |
| average | 100 | 97.3 | 95.4 |
| | | (−2.7) | (−2.8) |

TABLE 4

| P-P index | Control | longitudinal axial force | |
|---|---|---|---|
| | | tire rim assembly A | tire rim assembly B |
| 40 km/h | 100 | 100 | 98.6 |
| 60 km/h | 100 | 97.6 | 95.8 |
| 80 km/h | 100 | 95.7 | 97.2 |
| average | 100 | 97.7 | 97.2 |
| | | (−2.3) | (−2.8) |

The above tests reveal that an impact peak (P-P) is lowered in a waveform of the axial force after the vehicle has gone over protrusions, due to the operation of the sub-air chambers.

It was also noted that disposing a plurality of communicating holes in a single air chamber reduces the peak of impact, damps vibration earlier, and exhibits a superior damping performance.

(Experimental Demonstrations 9)

In order to confirm the effects of the present invention, a tire rim assembly according to Example and a tire rim assembly as the Control product were respectively attached to an actual vehicle, the vehicle was tested on a test course, and noise inside a vehicle was measured.

Rim wheel: 6JJ15

Tire: 195/55R15

Example: five sub-air chambers were formed in the rim wheel. As opposed to about 22000 cm³ of a volume of a tire main air chamber, a total volume of the sub-air chambers was 1350 cm³ (6.1% of the tire main air chamber). Four communicating holes were formed at a center of each of the sub-air chambers. Each of the communicating holes had a diameter of 0.3 cm and a length of 0.3 cm. Further, a resonance frequency was about 250 Hz.

Control: the rim wheel had cap members in the same manner as in the Example. However, all the communicating holes were closed by the cap members (the sub-air chambers and the tire main air chamber were not made to communicate with each other).

Figure 35:
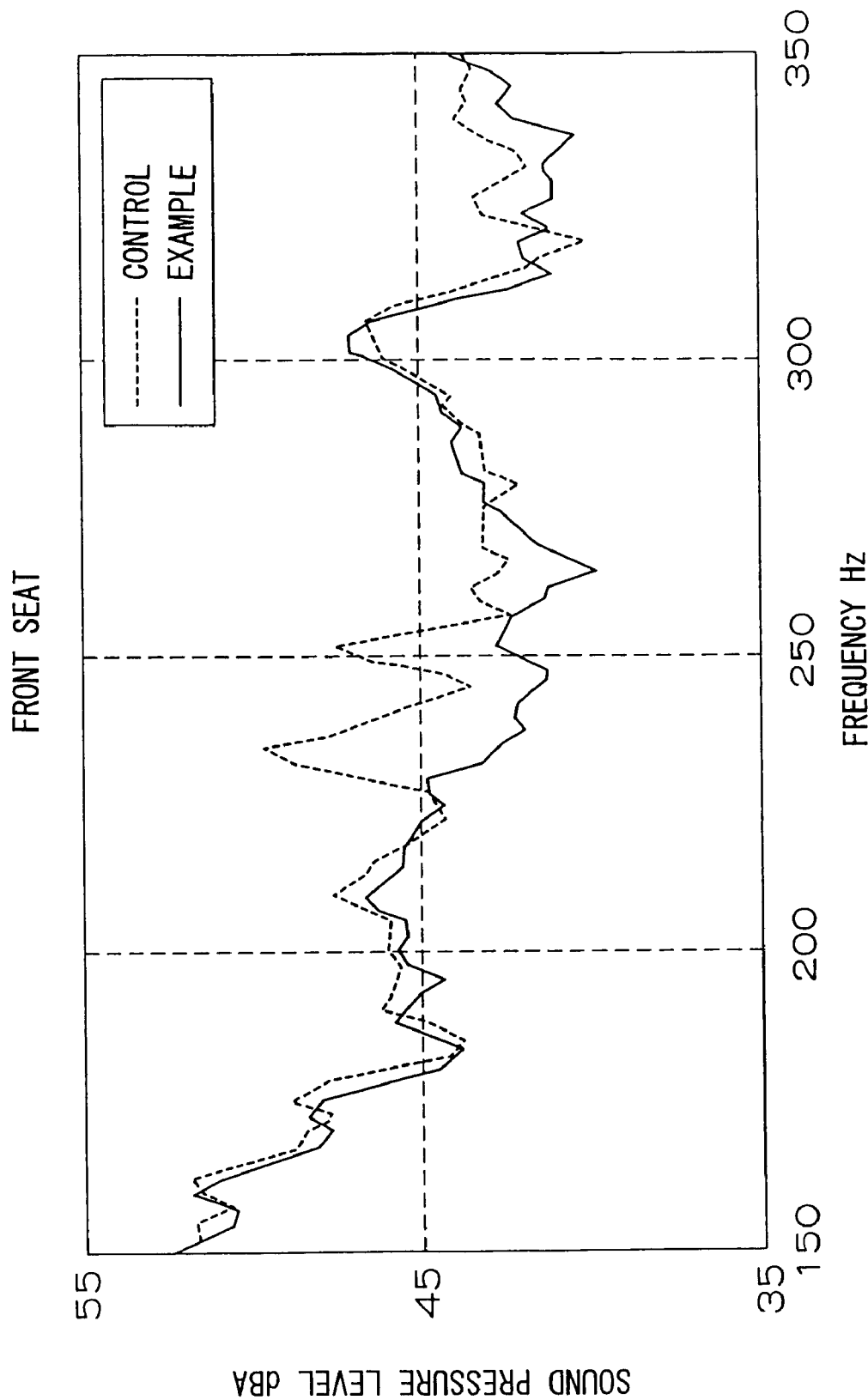
FIG. 35 shows noise frequency analysis results at an actual vehicle front seat both in Control and Example.
Figure 36:
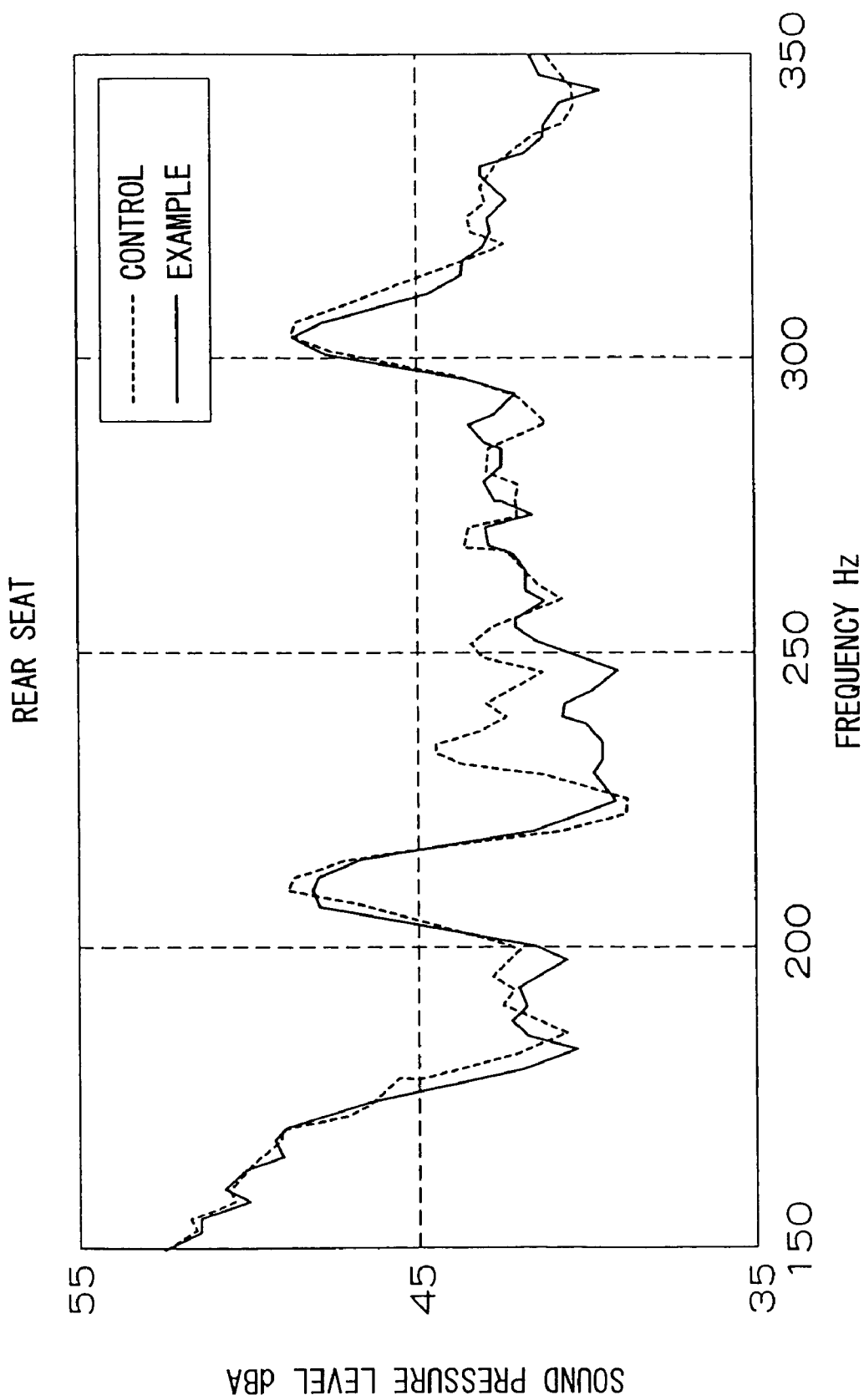
FIG. 36 shows noise frequency analysis results at an actual vehicle rear seat both in Control and Example.
Figure 37:
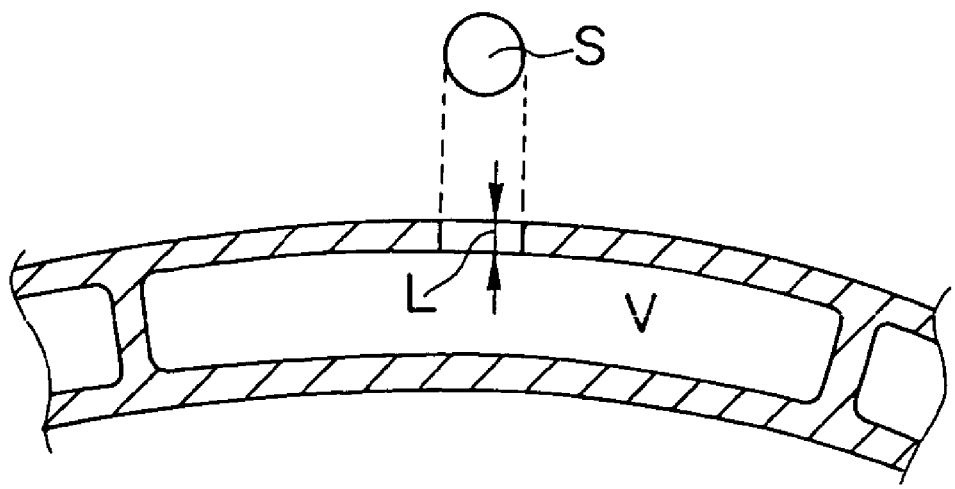
FIG. 37 is a cross-sectional view of a Helmholtz resonance noise absorber.
Figure 38:
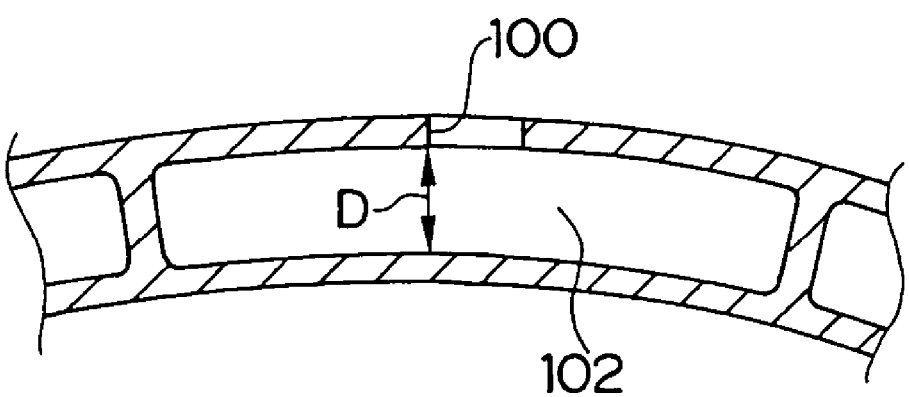
FIG. 38 is a cross-sectional view of vicinities of the communicating holes.

FIG. 35 is a graph illustrating the measurement results of noise inside a vehicle measured at a vehicle front seat while a vehicle was traveling at a speed of 60 km/h, and FIG. 36 is a graph illustrating the results of noise inside a vehicle measured at a vehicle rear seat.

The above tests reveal that use of the tire rim assembly in the Example lowers the peak of cavity resonance substantially both at the front seat and at the rear seat.

INDUSTRIAL APPLICABILITY

As described above, the rim wheel and the tire rim assembly according to the present invention can be suitably used for automobiles. More particularly, the rim wheel and the tire rim assembly according to the present invention can be suitably used when it is desired to reduce the level of noise inside the vehicle.

What is claimed is:

1. A rim wheel comprising:

three or more sub-air chambers which are formed between a rim and a plurality of cap members disposed outwardly in a radial direction of the rim, by no less than three sealed diaphragms which divides one sub-air chamber into three or more sub-air chambers, the one sub-air chamber being defined by the rim and the cap members, the sub-air chambers being discontinued in a rim circumferential direction, and the sealed diaphragms being separated from each other at predetermined intervals in the rim circumferential direction;

a concave well portion which is provided at at least one of the rim and the cap members, and has a bottom portion positioned radially inward of a bead seat; and a communicating portion which is provided at each of the cap members thus allowing a tire main air chamber and the sub-air chambers to communicate with each other, characterized in that a Helmholtz resonance noise absorber is constituted by the sub-air chambers and the communicating portion, which satisfy the following equation:

$$f_0 = 5411.4 \sqrt{\frac{S}{V(L + 0.8\sqrt{S/N})}} \qquad [F3]$$

$$= 1.48R^2 - 60.56R + 824.89 \pm 100$$

$f^0$: resonance frequency (Hz)

V: a volume of sub-air chambers (cm³)

S: a total cross-sectional area of communicating portions (cm²)

L: a length of a communicating portion (cm)

N: the number of communicating portions/air chamber

R: a wheel diameter (inch).

2. The rim wheel according to claim 1, characterized in that the cap members are kept in close contact with each other, the cap members and the rim are kept in close contact with each other, and the sub-air chambers and the tire main air chamber are made to communicate with each other, simply through holes as the communicating portions formed at each of the cap members.

3. The rim wheel according to claim 1, characterized in that, in a tire axial direction, a length of a gap between a position closest to a tire axial center of the communicating portion and an inner surface of the sub-air chamber at a rim wheel side is equal to or more than 5 mm.

4. The rim wheel according to claim 1, characterized in that the communicating portion is formed at a position separated in a tire circumferential direction by 30 mm or more from the sealed diaphragms corresponding to both ends of the sub-air chamber, and separated in a tire widthwise direction by 15 mm or more from the side walls corresponding to both ends of the sub-air chamber.

5. The rim wheel according to claim 1, characterized in that three holes or more that function as the communicating portions are formed at each of the cap members.

6. The rim wheel according to claim 1, characterized in that both end edge portions in the rim circumferential direction of the cap member are inclined surfaces inclining in the same direction, and one inclined surface on one cap member and one inclined surface of another adjacent cap member, which surfaces are adjacent to each other in the rim circumferential direction, are kept in close contact with one another.

7. The rim wheel according to claim 1, comprising:
a first step portion, which is parallel to an outer circumferential surface of the cap member, formed at one end edge side of the cap member in the rim circumferential direction, positioned inwardly in a rim radial direction of the outer circumferential surface, and faces outwardly in the rim radial direction, and a second step portion, which is in parallel to an inner circumferential surface of the cap member, formed at the other end edge side of the cap member in the rim circumferential direction, positioned outwardly in a rim radial direction of the inner circumferential surface, and faces inwardly in the rim radial direction, characterized in that at least portions of the first step portion and the second step portion of each of the cap members adjacent to each other in the rim circumferential direction are kept in close contact with one another in the rim widthwise direction.

8. A tire rim assembly in which a tire is attached to the rim wheel according to claim 1, characterized in that a total volume of the sub-air chambers is equal to or more than 2% and equal to or less than 25% of a tire main air chamber.

9. The tire rim assembly according to claim 8, characterized in that a compression rate of the tire is equal to or less than 60%.

10. The tire rim assembly according to claim 8, characterized in that the tire has a belt reinforcing layer to be spirally wrapped around and the belt reinforcing layer uses an organic fiber whose tensile modulus of elasticity is equal to or more than 6 GPa.

* * * * *